US012479596B2

(12) United States Patent
Sabe et al.

(10) Patent No.: US 12,479,596 B2
(45) Date of Patent: Nov. 25, 2025

(54) CONTROL DEVICE, CONTROL METHOD, AND FLIGHT VEHICLE DEVICE

(71) Applicant: Sony Group Corporation, Tokyo (JP)

(72) Inventors: Kohtaro Sabe, Tokyo (JP); Kayoko Tanaka, Tokyo (JP); Kousuke Suzuki, Tokyo (JP); Masaaki Masuda, Tokyo (JP); Takekazu Kakinuma, Tokyo (JP); Kazunori Hayashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 0 days.

(21) Appl. No.: 18/530,575

(22) Filed: Dec. 6, 2023

(65) Prior Publication Data

US 2024/0109670 A1     Apr. 4, 2024

Related U.S. Application Data

(63) Continuation of application No. 17/986,928, filed on Nov. 15, 2022, now Pat. No. 11,884,418, which is a
(Continued)

(30) Foreign Application Priority Data

Oct. 17, 2014 (JP) ................................ 2014-212657

(51) Int. Cl.
*B64D 47/02* (2006.01)
*G03B 7/093* (2021.01)
(Continued)

(52) U.S. Cl.
CPC ............. *B64D 47/02* (2013.01); *G03B 7/093* (2013.01); *G03B 15/00* (2013.01); *G03B 15/006* (2013.01);
(Continued)

(58) Field of Classification Search
CPC .... B64D 47/02; B64D 2203/00; G03B 7/093; G03B 15/00; G03B 15/006; G03B 15/02;
(Continued)

(56) References Cited

U.S. PATENT DOCUMENTS 6,006,158 A     12/1999  Pilley et al.
8,953,933 B2 *   2/2015  Ohtomo ............... G01C 11/025
                                                              701/28
(Continued)

FOREIGN PATENT DOCUMENTS

GB      2253067 A     8/1992
JP      2-131741 A    11/1990
(Continued)

OTHER PUBLICATIONS

Japanese Office Action issued Nov. 24, 2020, in corresponding Japanese Patent Application No. 2020-018566.

*Primary Examiner* — Abdullah A Riyami
*Assistant Examiner* — Syed M Kaiser
(74) *Attorney, Agent, or Firm* — XSENSUS LLP

(57) ABSTRACT

[Object] To provide a control device which enables a flight vehicle device to obtain a highly precise image.
[Solution] Provided is the control device including an illuminating control unit configured to adjust a light amount of an illuminating device according to an inclination of a fuselage of a flight vehicle device that has an imaging device configured to photograph a photographing target and the illuminating device configured to illuminate the photographing target.

17 Claims, 17 Drawing Sheets

Related U.S. Application Data continuation of application No. 15/993,052, filed on May 30, 2018, now Pat. No. 11,530,050, which is a continuation of application No. 15/510,407, filed as application No. PCT/JP2015/073674 on Aug. 24, 2015, now Pat. No. 10,011,371.

(51) Int. Cl.

| | | |
|---|---|---|
| *G03B 15/00* | (2021.01) | |
| *G03B 15/02* | (2021.01) | |
| *G03B 15/03* | (2021.01) | |
| *G03B 15/05* | (2021.01) | |
| *G03B 17/00* | (2021.01) | |
| *G03B 17/56* | (2021.01) | |
| *G05D 1/00* | (2006.01) | |
| *G05D 1/689* | (2024.01) | |
| *H04N 23/56* | (2023.01) | |
| *H04N 23/60* | (2023.01) | |
| *H04N 23/74* | (2023.01) | |
| *H05B 45/12* | (2020.01) | |
| *B64U 10/14* | (2023.01) | |
| *B64U 50/38* | (2023.01) | |
| *B64U 70/90* | (2023.01) | |
| *B64U 80/25* | (2023.01) | |
| *B64U 101/20* | (2023.01) | |
| *B64U 101/26* | (2023.01) | |
| *B64U 101/30* | (2023.01) | |

(52) U.S. Cl.
CPC ............ *G03B 15/02* (2013.01); *G03B 15/03* (2013.01); *G03B 15/05* (2013.01); *G03B 17/00* (2013.01); *G03B 17/56* (2013.01); *G05D 1/0094* (2013.01); *G05D 1/689* (2024.01); *H04N 23/56* (2023.01); *H04N 23/60* (2023.01); *H04N 23/64* (2023.01); *H04N 23/74* (2023.01); *H05B 45/12* (2020.01); *B64D 2203/00* (2013.01); *B64U 10/14* (2023.01); *B64U 50/38* (2023.01); *B64U 70/90* (2023.01); *B64U 80/25* (2023.01); *B64U 2101/20* (2023.01); *B64U 2101/26* (2023.01); *B64U 2101/30* (2023.01); *B64U 2201/104* (2023.01); *B64U 2201/20* (2023.01)

(58) Field of Classification Search
CPC ........ G03B 15/03; G03B 15/05; G03B 17/00; G03B 17/56; G05D 1/0094; G05D 1/689; H04N 23/56; H04N 23/60; H04N 23/64; H04N 23/74; H05B 45/12; B64U 10/14; B64U 50/38; B64U 70/90; B64U 80/25; B64U 2101/20; B64U 2101/26; B64U 2101/30; B64U 2201/104; B64U 2201/20; Y02T 50/50

See application file for complete search history.

(56) References Cited

U.S. PATENT DOCUMENTS

| | | | |
|---|---|---|---|
| 9,599,992 B2 | 3/2017 | Kohstall | |
| 10,011,371 B2 | 7/2018 | Sabe et al. | |
| 10,274,129 B2 | 4/2019 | Saika et al. | |
| 2002/0036617 A1 | 3/2002 | Pryor | |
| 2002/0176605 A1 | 11/2002 | Stafsudd et al. | |
| 2005/0187677 A1 | 8/2005 | Walker | |
| 2006/0017692 A1 | 1/2006 | Wehrenberg et al. | |
| 2007/0012349 A1 | 1/2007 | Gaudiana et al. | |
| 2009/0003822 A1 | 1/2009 | Tyner | |
| 2010/0009754 A1 | 1/2010 | Shimamura et al. | |
| 2010/0164718 A1 | 7/2010 | Parish et al. | |
| 2012/0069131 A1 | 3/2012 | Abelow | |
| 2012/0075168 A1 | 3/2012 | Osterhout et al. | |
| 2012/0091260 A1 | 4/2012 | Callou | |
| 2012/0232718 A1 | 9/2012 | Rischmuller et al. | |
| 2013/0200207 A1* | 8/2013 | Pongratz | B64U 70/20 244/2 |
| 2013/0233964 A1 | 9/2013 | Woodworth et al. | |
| 2014/0008496 A1 | 1/2014 | Ye et al. | |
| 2014/0009611 A1 | 1/2014 | Hiebl et al. | |
| 2014/0055613 A1 | 2/2014 | Ohtomo et al. | |
| 2014/0263823 A1 | 9/2014 | Wang et al. | |
| 2014/0339372 A1 | 11/2014 | Dekel et al. | |
| 2015/0035685 A1* | 2/2015 | Strickland | B60Q 9/008 340/901 |
| 2015/0035974 A1 | 2/2015 | Lavi et al. | |
| 2015/0054639 A1 | 2/2015 | Rosen | |
| 2015/0057844 A1 | 2/2015 | Callou et al. | |
| 2015/0181095 A1 | 6/2015 | Yamaguchi et al. | |
| 2015/0181099 A1 | 6/2015 | Van Der Tempel et al. | |
| 2015/0197335 A1 | 7/2015 | Dekel et al. | |
| 2015/0298822 A1 | 10/2015 | Eline et al. | |
| 2015/0370250 A1 | 12/2015 | Bachrach et al. | |
| 2016/0054837 A1 | 2/2016 | Stafford | |
| 2016/0062364 A1 | 3/2016 | Foinet et al. | |
| 2016/0105648 A1 | 4/2016 | Eline et al. | |
| 2016/0154170 A1 | 6/2016 | Thompson et al. | |
| 2016/0334794 A1 | 11/2016 | Johnson et al. | |
| 2017/0068252 A1 | 3/2017 | Yu | |
| 2017/0078553 A1 | 3/2017 | Sron et al. | |
| 2017/0113799 A1 | 4/2017 | Kovac et al. | |
| 2017/0221394 A1 | 8/2017 | Garcia Morchon et al. | |
| 2017/0261846 A1 | 9/2017 | Maes | |
| 2018/0002004 A1* | 1/2018 | Dekel | G05D 1/0858 |
| 2018/0095464 A1 | 4/2018 | Takayama et al. | |

FOREIGN PATENT DOCUMENTS

| | | | | |
|---|---|---|---|---|
| JP | 2001-257920 A | 9/2001 | | |
| JP | 2003110981 A | 4/2003 | | |
| JP | 2004-53293 A | 2/2004 | | |
| JP | 2004-101616 A | 4/2004 | | |
| JP | 2005-269413 A | 9/2005 | | |
| JP | 2006-27448 A | 2/2006 | | |
| JP | 2006-162717 A | 6/2006 | | |
| JP | 2007-33715 A | 2/2007 | | |
| JP | 2007-212952 A | 8/2007 | | |
| JP | 4239128 B2 | 3/2009 | | |
| JP | 2010-6089 A | 1/2010 | | |
| JP | 2012-40975 A | 3/2012 | | |
| JP | 2014040231 A | 3/2014 | | |
| JP | 2014113864 A | 6/2014 | | |
| KR | 20030068871 A | 8/2003 | | |
| WO | WO-2013105094 A1 * | 7/2013 | ............ | B64C 29/00 |
| WO | 2013/177059 A1 | 11/2013 | | |
| WO | WO-2014106814 A2 * | 7/2014 | ............ | B64C 39/02 |
| WO | 2014/161428 A1 | 10/2014 | | |

* cited by examiner

FIG. 12
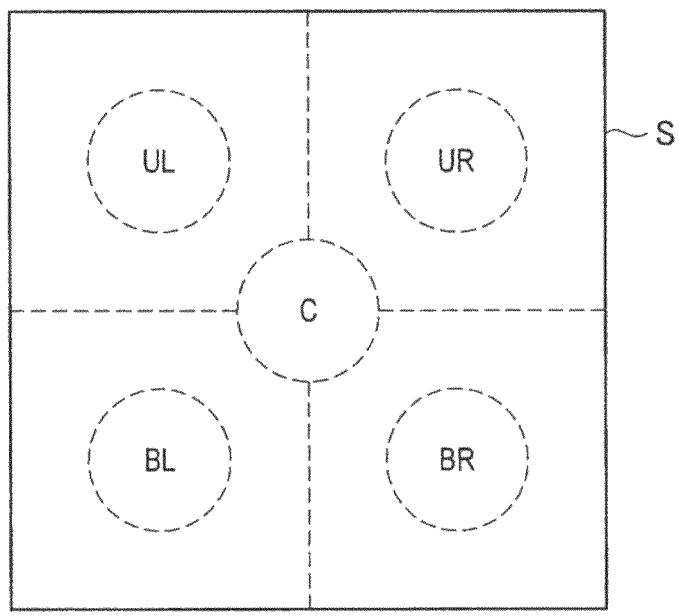
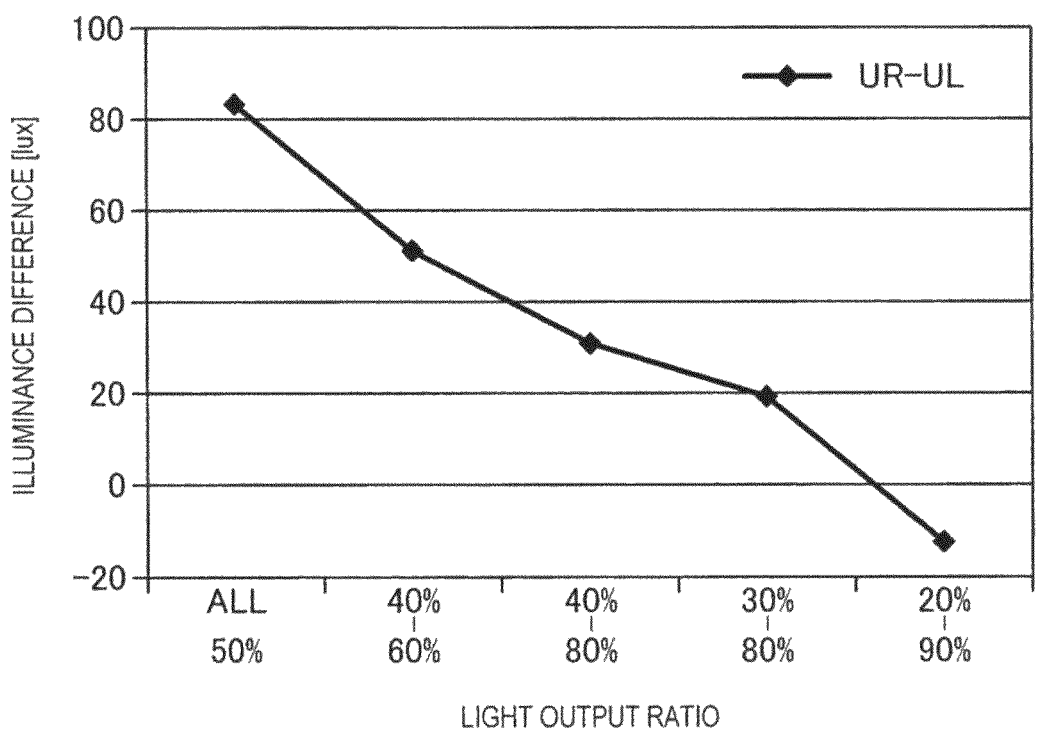

CONTROL DEVICE, CONTROL METHOD, AND FLIGHT VEHICLE DEVICE

CROSS-REFERENCE TO RELATED APPLICATIONS

The present application is a continuation of U.S. application Ser. No. 17/986,928, filed Nov. 15, 2022, which is a continuation of U.S. application Ser. No. 15/993,052, filed May 30, 2018 (now U.S. Pat. No. 11,530,050), which is a continuation of U.S. application Ser. No. 15/510,407, filed Mar. 10, 2017 (now U.S. Pat. No. 10,011,371), which is based on PCT filing PCT/JP2015/073674, filed Aug. 24, 2015, which claims priority to JP 2014-212657, filed Oct. 17, 2014, the entire contents of each are incorporated herein by reference.

TECHNICAL FIELD

The present disclosure relates to a control device, a control method, and a flight vehicle device.

BACKGROUND ART

A technology relating to a method for capturing photographs using a camera installed in a radio-controllable flight vehicle has been disclosed (for example, refer to Patent Literature 1). Using the camera installed in such a flight vehicle, it is possible to capture photographs from the sky or a position in which a tripod is difficult to set. Capturing using a camera installed in a flight vehicle brings various advantages in that costs can be suppressed, and safe capturing, capturing at a low altitude or in a narrow place, capturing in proximity to a target, and the like are possible in comparison to when a real aircraft or helicopter is used.

CITATION LIST

Patent Literature

Patent Literature 1: JP 2006-27448A

DISCLOSURE OF INVENTION

Technical Problem

It is considered that, if such a flight vehicle equipped with a camera enables human beings to effectively capture a situation of a place to which access is not easy for them, it will be very helpful for inspecting structures to which an approach is difficult for human beings. For example, using flight vehicles to inspect social infrastructures such as bridges, tunnels, dams, and roads built across rivers or seas, industrial infrastructures such as airports, buildings, warehouses, factories, and plants can be considered.

Here, images used to inspect structures as described above are required to have precision sufficient for detecting defects having a prescribed size such as cracks. As a method of photographing images having high precision without using a tower wagon, or the like, for example, photographing with a camera fixed to a tripod using a high-magnification zoom lens is considered. This method, however, has a limitation in the photographable range of a camera. On the other hand, if a flight vehicle with a camera mounted thereon is used, it can approach and photograph targets. However, since flight vehicles have difficulty in completely standing still due to wind and the like, and are influenced by vibration resulting from rotation of propellers and the like, it is difficult to obtain images having high precision sufficient for ascertaining exact damage of structures.

Therefore, a novel and improved control device, control method, and flight vehicle device which enable highly precise images to be obtained are proposed.

Solution to Problem

According to the present disclosure, there is provided a control device including: an illuminating control unit configured to adjust a light amount of an illuminating device according to an inclination of a fuselage of a flight vehicle device that has an imaging device configured to photograph a photographing target and the illuminating device configured to illuminate the photographing target.

In addition, according to the present disclosure, there is provided a control method including: acquiring an inclination of a fuselage of a flight vehicle device with respect to a photographing target, the flight vehicle device including an imaging device configured to photograph the photographing target, and an illuminating device configured to illuminate the photographing target; and adjusting a light amount of the illuminating device according to the inclination of the fuselage.

In addition, according to the present disclosure, there is provided a flight vehicle device including: an imaging device configured to photograph a photographing target; an illuminating device configured to illuminate the photographing target; and a control unit configured to adjust a light amount of the illuminating device according to an inclination of a fuselage with respect to the photographing target.

Advantageous Effects of Invention

According to the present disclosure described above, highly precise image can be obtained in photographing using a flight vehicle device. Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 12 is an explanatory diagram illustrating changes in illuminance of the surface illuminated by the illuminating device when the hovering camera is in the state of FIG. 11.

MODE(S) FOR CARRYING OUT THE INVENTION

Figure 1:
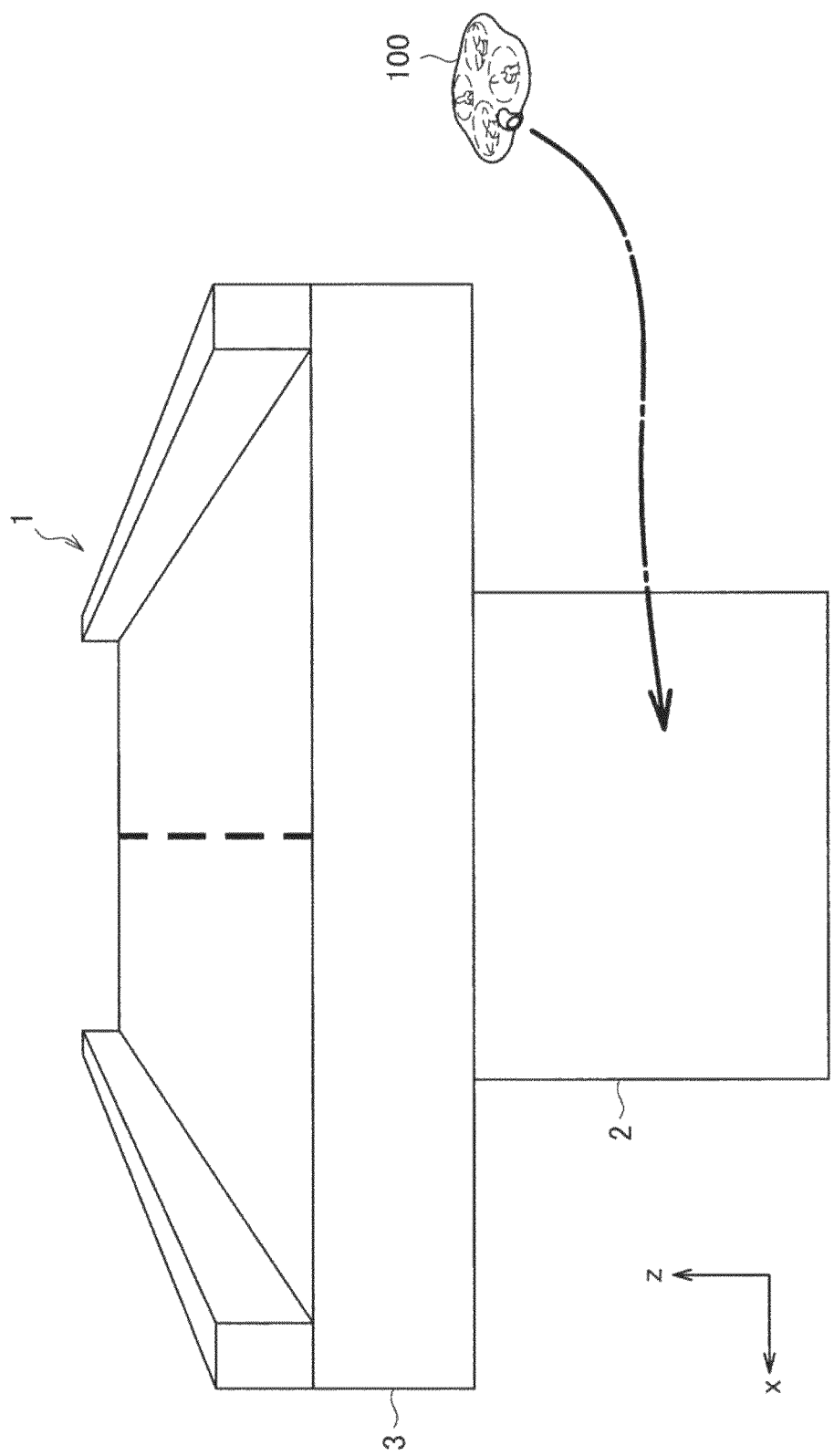
FIG. 1 is an explanatory diagram for describing an overview of photographing of a structure using a hovering camera according to an embodiment of the present disclosure.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Note that description will be provided in the following order.

1. Overview
2. Exemplary system configuration
3. Exemplary functional configuration
   3.1. Hovering camera
   3.2. Control terminal
4. Exemplary operation of inspection system
5. Application to acquisition of highly precise images
   5.1. Functional configuration
   5.2. Light modulation control of illuminating device
      (1) Photographing conditions
      (2) Configuration of illuminating device
      (3) Light amount control of illuminating device according to inclination of fuselage
   5.3. Exemplary control of imaging device and illuminating device at time of photographing
   5.4. Lens inclination control of imaging device
6. Conclusion

1. Overview

Before a configuration of a flight vehicle device and a photographing method of a structure according to an embodiment of the present disclosure, first, an overview of photographing of a structure using a flight vehicle device (hovering camera) 100 equipped with an imaging device according to the present embodiment will be described based on FIG. 1. Note that FIG. 1 is an explanatory diagram for describing the overview of photographing of a structure using the hovering camera 100 according to the present embodiment.

Checking states of structures by humans is indispensable in operation and maintenance of the structures such as roads, bridges, tunnels, and buildings. Typically, for visual checking of such a structure, commonly, a worker approaches a structure, and visually checks whether or not damage such as corrosion or a crack or looseness of a coupling member such as a bolt has occurred in the structure or performs a hammering test to check the presence or absence of such abnormalities.

For operation and maintenance of a bridge, particularly, a concrete bridge, for example, it is necessary to set up a scaffold at a back side portion of a bridge pier or a bridge girder for a worker who performs a visual inspection and a hammering test of a bridge girder or a bridge pier, or it is necessary to close some lanes or all lanes in order to secure safety of workers or place a work vehicle. For this reason, a cost necessary for an inspection, a cost necessary for a placement of a road guide person due to road closing, and a traffic jam of a detour occurring by road closing can be problematic.

Further, for example, when built above a river or a sea, there is a bridge at which it is not easy to set up a scaffold or it is difficult to set up a scaffold. Thus, in view of such circumstances, a technique capable of implementing an inspection of a structure at a low cost with high safety without influencing traffic is desirable.

Thus, the disclosers of the present application have reviewed a technique capable of implementing an inspection of a structure at a low cost with high safety without influencing traffic in view of such circumstances. Further, the disclosers of the present application have ended up with a proposal of a technique capable of implementing an inspection at a low cost with high safety without influencing traffic using a flight vehicle equipped with an imaging device (hereinafter, the flight vehicle equipped with the imaging device is also referred to as a "hovering camera") which will be described below.

FIG. 1 schematically illustrates a bridge 1 constructed of concrete. When the bridge 1 constructed of concrete is inspected, a worker visually inspects whether or not damage such as a crack or corrosion has occurred in a related art. In order for a worker to visually inspect, it is necessary to set up a scaffold at a back side portion of a bridge pier 2 or a bridge girder 3 or it is necessary to close some lanes or all lanes in order to secure safety of a worker or place a work vehicle.

Regarding such a visual inspection, in the present embodiment, the hovering camera 100 is used to inspect the bridge 1. The hovering camera 100 is a flying body equipped with an imaging device which is configured to perform an automatic flight according to flight information (including a flight path and information of an imaging position of a still image in the present embodiment) which is set in advance. Examples of the information of the imaging position of the still image include a position at which an imaging process is executed, an imaging direction, and a traveling time to a position at which a next imaging process is executed.

For example, when a back side (a bottom surface) of the bridge girder 3 is inspected, the hovering camera 100 is operated to perform an automatic flight to capture the back side of the bridge girder 3. By causing the hovering camera 100 to capture the back side of the bridge girder 3, it is unnecessary to set up a scaffold at the back side portion of the bridge pier 2 or the bridge girder 3 for an inspection of the bridge girder 3, the frequency of lane closing is reduced or it is unnecessary to perform lane closing. Further, for example, when the side (side surface) of the bridge girder 3 is inspected, the hovering camera 100 is operated to perform an automatic flight to capture the side of the bridge girder 3. Thus, by causing the hovering camera 100 to perform an automatic flight and causing the hovering camera 100 to capture the back side or the side of the bridge girder 3, it is possible to inspect the bridge 1 at a low cost while securing the safety of a worker without influencing traffic.

At that time, images photographed by the hovering camera 100 are required to have precision sufficient for checking for fine cracks and the like. In the hovering camera 100 according to the present embodiment, the flight vehicle includes an illuminating mechanism which illuminates a photographing surface of a photographing target, and the illuminance of the photographing surface is set to be substantially constant. By illuminating a target illumination position (i.e., a photographing place) with a certain level or higher of uniform illuminance, the quality of image photographing is maintained. A configuration of the hovering camera 100 according to the present embodiment and a photographing method of a structure using the camera will be described in detail below.

2. Exemplary System Configuration

Figure 2:
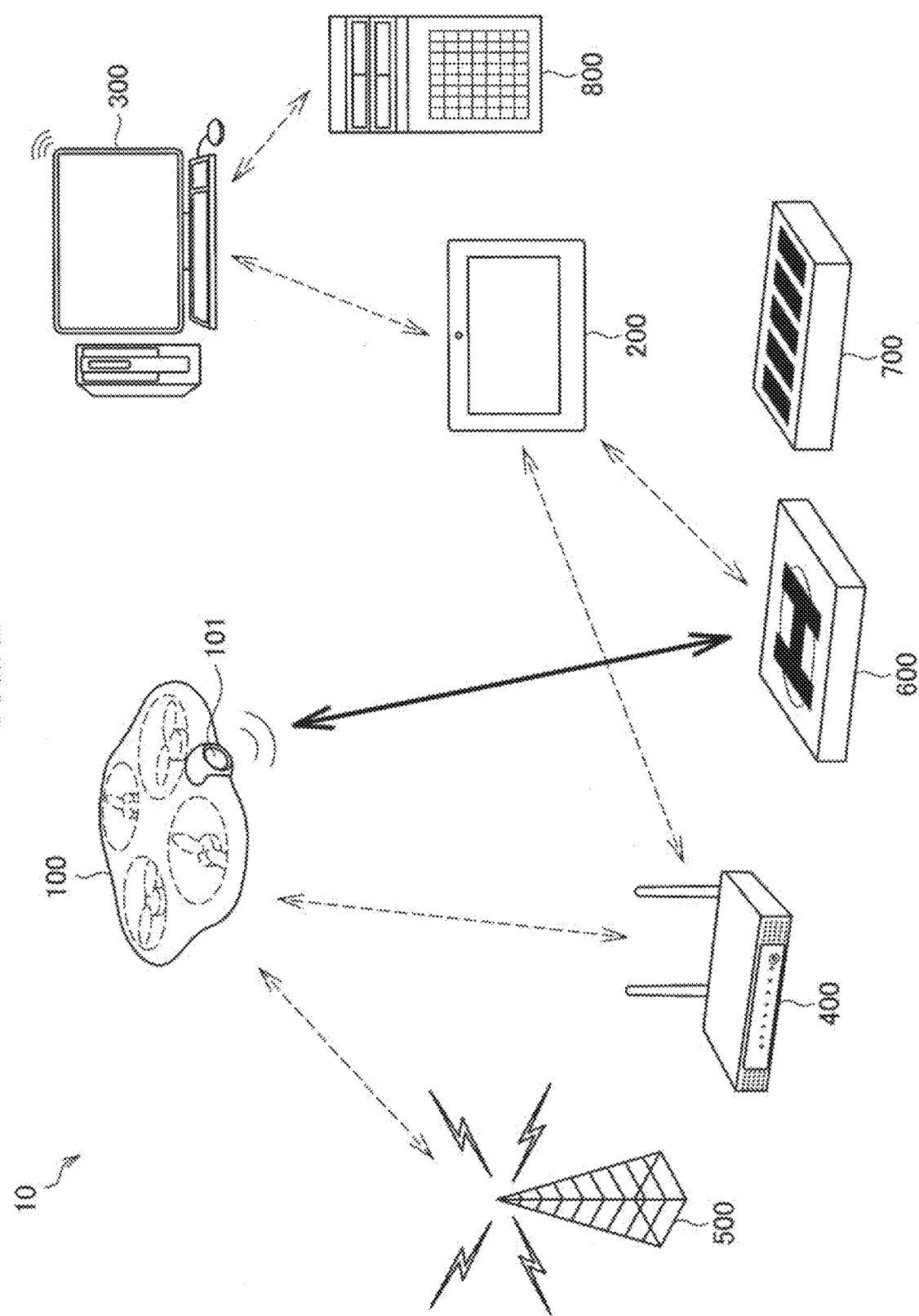
FIG. 2 is an explanatory diagram illustrating an exemplary system configuration of an inspection system according to the embodiment of the present disclosure.

FIG. 2 is an explanatory diagram illustrating an exemplary system configuration of an inspection system 10 according to the embodiment. The inspection system 10 according to the embodiment illustrated in FIG. 2 is a system that is configured to efficiently inspect a structure, for example, the bridge 1. An exemplary system configuration of the inspection system 10 according to the embodiment will be described below with reference to FIG. 2.

As illustrated in FIG. 2, the inspection system 10 according to the embodiment of the present disclosure includes the hovering camera 100, a control terminal 200, an information processing device 300, a wireless relay node 400, a position estimation node 500, a base station 600, a charging station 700, and a server device 800.

The hovering camera 100 is an exemplary imaging device of the present disclosure and serves as the flight vehicle equipped with the imaging device described above. The hovering camera 100 is a flight vehicle configured to be able to perform an automatic flight based on a designated flight path and capture a still image at a designated imaging position through the imaging device. The hovering camera 100 can fly, for example, through four rotors and fly while moving upward, downward, or forward by controlling the rotation of each rotor. Of course, the number of rotors is not limited to the relevant example.

A flight path from a flight start position to a flight end position and the imaging position set for the hovering camera 100 are set as position information of a Global Positioning System (GPS), for example. Thus, a GPS receiver that receives radio waves from GPS satellites and calculates a current position may be incorporated into the hovering camera 100. The flight path set for the hovering camera 100 may be set using all of a latitude, a longitude, and an altitude as GPS position information or may be set using only a latitude and a longitude as the GPS position information, and, for example, a relative height from the base station 600 which will be described below may be set as an altitude.

The control terminal 200 is an exemplary control device of the present disclosure and serves as a terminal that executes control related to a flight of the hovering camera 100. As the control related to the flight of the hovering camera 100, for example, the control terminal 200 generates flight information to be transmitted to the hovering camera 100, gives a takeoff instruction to the hovering camera 100, gives a return instruction to the base station 600 which will be described below. Further, the control terminal 200 may fly the hovering camera 100 when the hovering camera 100 does not fly automatically due to a certain reason. A generation process of the flight information of the hovering camera 100 by the control terminal 200 will be described in detail below but will be described briefly here.

When the flight information of the hovering camera 100 is generated, the control terminal 200 reads the information related to the overview of the bridge 1 to be inspected, for example, an overview diagram of the bridge 1 to be inspected, and causes the read information to be displayed on a screen. Points on the overview diagram of the bridge 1 are associated with points on map data including more detailed GPS information. The associating is preferably performed by at least two sets of points. The overview diagram of the bridge 1 is associated with points on the map data including detailed GPS information in advance, and thus the flight path of the hovering camera 100 is defined as GPS values. Then, the control terminal 200 generates the flight path of the hovering camera 100 based on the overview diagram of the bridge 1. The flight path of the hovering camera 100 is displayed on the overview diagram in a superimposed manner so that it is easily understood by the user (structure inspection worker).

The control terminal 200 may consider a structure or dimension of the bridge 1 or a portion of the bridge 1 to be captured by the hovering camera 100 when generating the flight information of the hovering camera 100. The control terminal 200 may generate the flight information for causing the hovering camera 100 to capture a portion, in detail, considered likely to be damaged when generating the flight information of the hovering camera 100.

As described above, the flight path set to the hovering camera 100 may be set using all of a latitude, a longitude, and an altitude as the GPS position information, but a case in which no altitude data is included in the overview diagram of the bridge 1 is considered. When no altitude data is included in the overview diagram of the bridge 1, the flight path set to the hovering camera 100 is set using only a latitude and a longitude as the GPS position information, and, for example, a relative height from the base station 600 may be set as an altitude.

When the flight information is set for the hovering camera 100, the control terminal 200 preferably generates the flight information so that a distance to an imaging target surface becomes constant when the hovering camera 100 captures the bridge 1. Since the flight information is generated so that the distance to the imaging target surface becomes constant when the hovering camera 100 captures the bridge 1, the control terminal 200 can cause the hovering camera 100 to generate images having the same scale.

The control terminal 200 is a portable device such as a laptop computer or a tablet terminal, and performs wireless transmission and reception of information to/from the hovering camera 100. The control terminal 200 may perform wireless communication with the hovering camera 100 directly with the hovering camera 100. Note that there may be cases in which the hovering camera 100 flies beyond a communication range of the control terminal 200 in an inspection of a structure, particularly, the bridge 1. Therefore, the control terminal 200 may perform wireless communication with the hovering camera 100 through the wireless relay node 400 installed at the time of inspection.

The control terminal 200 acquires an image captured by the imaging device while the hovering camera 100 is flying, and displays the acquired image on the display of the control terminal 200 as necessary. The control terminal 200 may acquire a moving image captured by the imaging device in a streaming manner while the hovering camera 100 is flying and display the acquired moving image on the display. Since the moving image captured by the imaging device is acquired in the streaming manner while the hovering camera 100 is flying and displayed on the display, the control terminal 200 can present a position at which the hovering camera 100 is flying to the user.

The information processing device 300 is a device that processes a variety of information and may be, for example, a device having a function of processing information such as a personal computer (PC), a game machine, or the like. In the present embodiment, the information processing device 300 is a device having a function of displaying, particularly, an image captured by the hovering camera 100 on the display of the information processing device 300 and enables the user to check the state of the bridge 1. The information processing device 300 has a function of calculating an absolute position of damage of the bridge girder 3 from the image captured by the hovering camera 100 and generating damage data which will be described below. The information processing device 300 may have a function of transmitting the generated damage data to the server device 800. Further, the control terminal 200 may have the function of calculating an absolute position of damage of the bridge girder 3 from the image captured by the hovering camera 100 and generating damage data which will be described below.

The information processing device 300 acquires the image captured by the hovering camera 100, for example, from the control terminal 200. The time for acquiring of the image captured by the hovering camera 100 by the information processing device 300 is not limited, and, for example, the information processing device 300 may acquire the image captured by the hovering camera 100 from the control terminal 200 at a time at which one flight of the hovering camera 100 ends.

The wireless relay node 400 is a device that relays wireless communication between the hovering camera 100 and the control terminal 200. As described above, the hovering camera 100 may fly beyond the communication range of the control terminal 200 at the time of inspection of a structure, particularly, the bridge 1. Thus, wireless communication between the hovering camera 100 and the control terminal 200 can be performed through the wireless relay node 400 installed at the time of inspection of a structure. The number of wireless relay nodes 400 is not limited to 1, and a plurality of wireless relay nodes 400 may be installed depending on an inspection range of the bridge 1. Thus, wireless communication between the hovering camera 100 and the control terminal 200 may be performed through a plurality of wireless relay nodes 400. The hovering camera 100 can switch a communication destination between the control terminal 200 and the wireless relay node 400 according to a situation of the radio waves.

The wireless relay node 400 may be installed at an appropriate position on a bridge face (preferably, on a sidewalk) at the time of inspection of the bridge 1. The wireless relay node 400 may be installed so as to be suspended from a parapet of the bridge girder 3. Further, before the inspection of the bridge 1, it is desirable to check whether or not the wireless relay node 400 operates normally, for example, using the control terminal 200 by a certain method.

The position estimation node 500 is a device that causes the hovering camera 100 to estimate a current position. As described above, the flight path of the hovering camera 100 is set, for example, using the GPS position information. At this time, when the radio waves from the GPS satellites are not blocked, the hovering camera 100 can detect the current position with a high degree of accuracy. However, it is not avoidable that the hovering camera 100 flies under the bridge girder 3. If the radio waves from the GPS satellites are blocked by the bridge girder 3 or a multipath occurs due to reflection of the radio waves by the bridge 1, for example, the hovering camera 100 is unlikely to detect the current position with a high degree of accuracy.

In this regard, in the present embodiment, the position estimation node 500 is installed under the bridge girder 3 in order to enable the hovering camera 100 to acquire the current position accurately. For example, an augmented reality (AR) marker or a GPS signal transmitter may be used as the position estimation node 500.

When the AR marker is used as the position estimation node 500, in order to enable the hovering camera 100 to recognize the current position, for example, position estimation nodes 500 are suspended from both ends of the bridge 1, and the hovering camera 100 is caused to capture the position estimation node 500. Further, the hovering camera 100 that has captured the position estimation node 500 is caused to fly between the designated position estimation nodes 500. The hovering camera 100 can detect the position between the position estimation nodes 500, for example, based on an integration value of a sensor (for example, an inertial measurement unit (IMU) sensor) installed in the hovering camera 100 and a distance to the position estimation node 500 of the movement destination calculated from the captured image. Thus, the hovering camera 100 captures the position estimation node 500 and thus can acquire the current position even under the bridge girder 3 accurately.

Further, when the GPS signal transmitter is used as the position estimation node 500, in order to enable the hovering camera 100 to recognize the current position, for example, position estimation nodes 500 are installed at opposing corners or four corners of the bridge 1. The hovering camera 100 receives the GPS signal transmitted from the position estimation nodes 500 and thus can acquire the current position accurately even under the bridge girder 3.

The base station 600 is a device installed for takeoff and landing of the hovering camera 100. The base station 600 includes a GPS receiver, and receives the radio waves from the GPS satellites and calculates the current position. The current position calculated by the base station 600 is transmitted to the control terminal 200. Since the current position calculated by the base station 600 is transmitted to the control terminal 200, the control terminal 200 can cause the position of the base station 600 to be displayed on the overview diagram of the bridge 1.

The base station 600 may have a function of checking an operation of the hovering camera 100. Examples of the operation check of the hovering camera 100 performed by the base station 600 include a communication function check, an imaging function check, a flight function check, and calibration of various types of sensors. Further, the calibration method of the sensors of the hovering camera 100 is not limited to the method of using the base station 600. For example, as the calibration method of the sensors of the hovering camera 100, a method of fixing the hovering camera 100 in a dedicated calibration and correcting the sensors by rotating the hovering camera 100 in a pitch direction or a roll direction may be used.

The charging station 700 electrically charges a secondary battery installed in the hovering camera 100. The hovering camera 100 uses a battery as a power source, and expends electrical power accumulated in the battery during the flight or the capturing. When the battery installed in the hovering camera 100 is the secondary battery, the charging station 700 can restore electric power expended by the hovering camera 100 by charging the battery. The charging station 700 may charge the hovering camera 100 by connecting a cable or the like to the hovering camera 100 and supplying electric power to the hovering camera 100. Alternatively, the charging station 700 may charge the hovering camera 100 by supplying electric power to the hovering camera 100 by a non-contact power transmission scheme.

The server device 800 is a device that stores various types of data. In the present embodiment, the server device 800 may store damage data generated by the information processing device 300.

The inspection system 10 according to the embodiment of the present disclosure has the configuration illustrated in FIG. 2 and can cause the hovering camera 100 to capture the bridge 1 and acquire the image of the bridge 1. Since the hovering camera 100 is caused to capture the bridge 1, it is unnecessary to set up a scaffold at a bridge pier or a bridge girder, the frequency in which some lanes or all lanes are closed in order to secure safety of a worker is reduced, and it is unnecessary to close lanes. Thus, the inspection system 10 according to the embodiment of the present disclosure makes the inspection of the bridge 1 to be efficiently performed at a low cost.

An exemplary system configuration of the inspection system 10 according to the embodiment of the present disclosure has been described above. Next, exemplary functional configurations of the hovering camera 100 and the control terminal 200 configuring the inspection system 10 according to the embodiment of the present disclosure will be described.

3. Exemplary Functional Configuration

[3.1. Hovering Camera]

Figure 3:
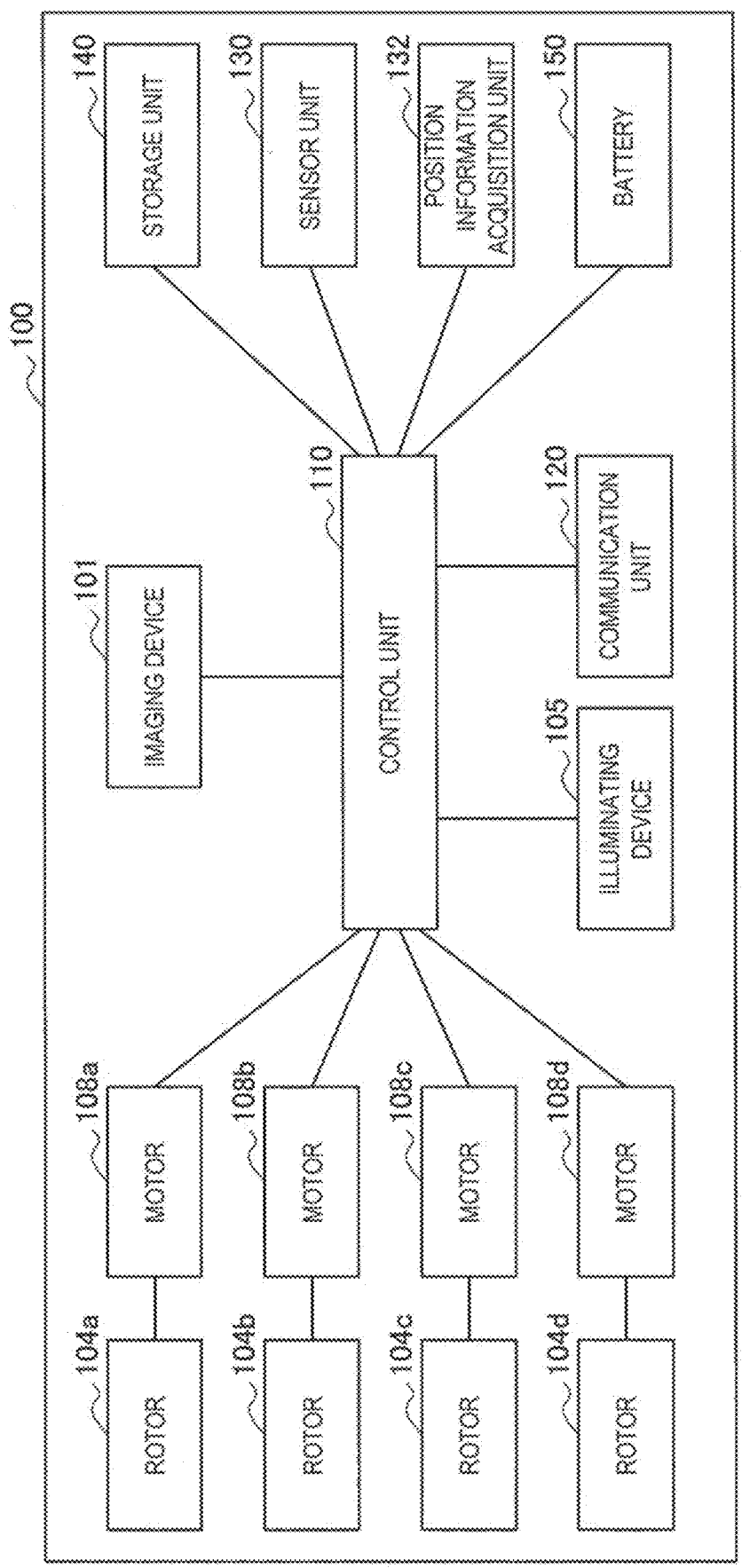
FIG. 3 is an explanatory diagram illustrating an exemplary functional configuration of the hovering camera according to the embodiment of the present disclosure.

An exemplary functional configuration of the hovering camera 100 according to the present embodiment will be described based on FIG. 3. FIG. 3 is an explanatory diagram illustrating the exemplary functional configuration of the hovering camera 100 according to the present embodiment.

As illustrated in FIG. 3, the hovering camera 100 according to the present embodiment is configured to include an imaging device 101, an illuminating device 105, rotors 104$a$ to 104$d$, motors 108$a$ to 108$d$, a control unit 110, a communication unit 120, a sensor unit 130, a position information acquisition unit 132, a storage unit 140, and a battery 150.

The control unit 110 controls operations of the hovering camera 100. For example, the control unit 110 performs adjustment of rotational speeds of the rotors 104$a$ to 104$d$ through adjustment of rotational speed of the motors 108$a$ to 108$d$, an imaging process using the imaging device 101, control of illumination of the illuminating device 105, and the like. In addition, the control unit 110 can control processes for transmission and reception of information to and from another device (for example, the control terminal 200) via the communication unit 120, and recording and reading of information on and from the storage unit 140. The control unit 110 includes a processor such as a central processing unit (CPU) or a processing circuit, and as the processor or the processing circuit performs programs and processes of various kinds, functions of various functional parts of the control unit 110 are realized. Furthermore, the control unit 110 may include a memory or a storage device which temporarily or permanently stores a program executed by the processor or the processing circuit and data read and written in processes.

In the present embodiment, the control unit 110 controls a flight in which the rotational speed of the motors 108$a$ to 108$d$ is adjusted and execution of the imaging process of the still image by the imaging device 101 based on the flight information transmitted from the control terminal 200. The control unit 110 controls the motors 108$a$ to 108$d$ or the imaging device 101 based on the flight information transmitted from the control terminal 200 and thus can provide an image to the control terminal 200 based on a request of the control terminal 200.

The imaging device 101 is configured with a lens, an image sensor such as a CCD image sensor or a CMOS image sensor, and the like. The imaging device 101 installed in the fuselage of the hovering camera 100 captures a still image or a moving image according to control from the control terminal 200. The image captured by the imaging device 101 is transmitted from the communication unit 120 to the control terminal 200. In the present embodiment, the imaging device 101 performs the imaging process based on the information of the imaging position of the still image included in the flight information transmitted from the control terminal 200. The image obtained by the imaging process of the imaging device 101 is recorded in the storage unit 140 or transmitted from the communication unit 120 to the control terminal 200. When the hovering camera 100 images the bottom surface side of the bridge 1, insufficient brightness due to the bridge 1 blocking sunlight is conceivable, and for that reason, the hovering camera 100 according to the present embodiment has the illuminating device 105 for making an illuminance in a photographing range uniform during imaging as will be described below.

The imaging device 101 can change the imaging direction, for example, to an arbitrary direction by the control from the control unit 110. For example, when the horizontal direction of the hovering camera is assumed to be 0°, the capturing can be performed in an imaging direction indicated by a range of ±90° vertically. As the imaging device 101 changes the imaging direction, the hovering camera 100 can capture an image in a certain direction and provides a captured image to the control terminal 200. Then, the control unit 110 associates position information of the hovering camera 100 when the imaging device 101 captures a still image, fuselage information at the time of capturing (i.e., information on the hovering camera 100 at the time of capturing), and information of the imaging direction as metadata of the still image.

Note that position information of the hovering camera 100 can also include position information based on positioning by the GPS, and positioning using the position estimation nodes 500. Fuselage information at the time of imaging includes information of, for example, an inclination of the fuselage of the hovering camera 100 with reference to a reference plane (for example, a yaw angle, a pitch angle, and a roll angle), an inclination of the fuselage of the hovering camera 100 with respect to a photographing target, acceleration, an angular velocity, and the like. The reference plane referred to here is, for example, a horizontal plane with respect to the ground. An inclination of the fuselage of the hovering camera 100 with respect to a photographing target refers to, for example, an angle formed between the photographing target such as the bottom surface or a side surface of a bridge and the fuselage of the hovering camera 100. As a method of storing the associated metadata, the metadata may be added to an additional information region (for example, a specific region of an Exif format) of still image data, or the metadata may be recorded in an image file, a separate file, or the like as separate data.

The rotors 104a to 104d cause the hovering camera 100 to fly by generating a lift force from rotation thereof. Rotation of the rotors 104a to 104d is caused by rotation of the motors 108a to 108d. The motors 108a to 108d cause the rotors 104a to 104d to rotate. The rotation of the motors 108a to 108d can be controlled by the control unit 110.

The illuminating device 105 is a mechanism for making an illuminance of a photographing range of the imaging device 101 of the hovering camera 100 uniform. The illuminating device 105 is configured to include, for example, a plurality of light sources. As the light sources, for example, LED light sources may be used. Note that a detailed configuration of the illuminating device 105 will be described below. In the present embodiment, the control unit 110 controls a light amount of the light sources constituting the illuminating device 105 according to an attitude (an inclination) of the hovering camera 100 with respect to a photographing surface of the photographing target. Accordingly, the illuminance of the photographing range of the imaging device 101 can be set to be uniform, and thus precision of images photographed by the imaging device 101 can be improved.

Note that a process of the control unit 110 according to the present embodiment to improve precision of images acquired by the imaging device 101 will be described below in detail.

The communication unit 120 performs transmission and reception processes of information to/from the control terminal 200 through wireless communication. The hovering camera 100 transmits images captured by the imaging device 101 from the communication unit 120 to the control terminal 200. In addition, the hovering camera 100 receives instructions relating to flight from the control terminal 200 using the communication unit 120.

The sensor unit 130 is a group of devices that acquire states of the hovering camera 100, and may include, for example, an acceleration sensor, a gyro sensor, an ultrasonic sensor, a barometric sensor, an optical flow sensor, a laser range finder that measures the distance to the target, and the like. The sensor unit 130 can convert an acquired state of the hovering camera 100 into a predetermined signal, and provide the signal to the control unit 110 when necessary.

The control unit 110 may generate information about an inclination of the fuselage with respect to the reference plane (for example, a yaw angle, a pitch angle, and a roll angle) from, for example, acceleration information of the acceleration sensor and angular velocity information of the gyro sensor provided from the sensor unit 130. In addition, the control unit 110 can acquire a distance from the hovering camera 100 to the photographing target based on sensing information of the laser range finder of the sensor unit 130. A plurality of laser range finders can be provided in the fuselage of the hovering camera 100 at predetermined intervals. In this case, the control unit 110 can acquire information of an inclination of the fuselage of the hovering camera 100 with respect to a surface of the photographing target as well as information of an inclination of the fuselage of the hovering camera 100 with respect to the reference plane by performing calculation using sensing information from the plurality of laser range finders.

The position information acquisition unit 132 acquires information of a current position of the hovering camera 100 using, for example, the GPS, a vision sensor, or the like. The position information acquisition unit 132 can provide the acquired information of the current position of the hovering camera 100 to the control unit 110 when necessary. The control unit 110 executes control of the flight of the hovering camera 100 based on the flight information received from the control terminal 200 using the information of the current position of the hovering camera 100 acquired by the position information acquisition unit 132.

The sensor unit 130 detects an obstacle that may interfere with a flight at the time of the flight. As the sensor unit 130 detects an obstacle, the hovering camera 100 can provide information related to the detected obstacle to the control terminal 200.

The storage unit 140 stores a variety of information. Examples of the information stored in the storage unit 140 include the flight information of the hovering camera 100 transmitted from the control terminal 200 and an image captured by the imaging device 101.

The battery 150 accumulates electric power for operating the hovering camera 100. The battery 150 may be a primary battery in which only discharging is possible or may be a secondary battery in which charging is also possible, but when the battery 150 is the secondary battery, for example, the battery 150 can be supplied with electric power from the charging station 700 illustrated in FIG. 2.

The hovering camera 100 according to the present embodiment may have the configuration illustrated in FIG. 3 and thus can perform an automatic flight based on the flight path included in the flight information transmitted from the control terminal 200 and execute the imaging process based on the information of the imaging position of the still image included in the flight information transmitted from the control terminal 200.

An exemplary functional configuration of the hovering camera 100 according to the present embodiment has been described above using FIG. 3.

[3.2. Control Terminal]

Figure 4:
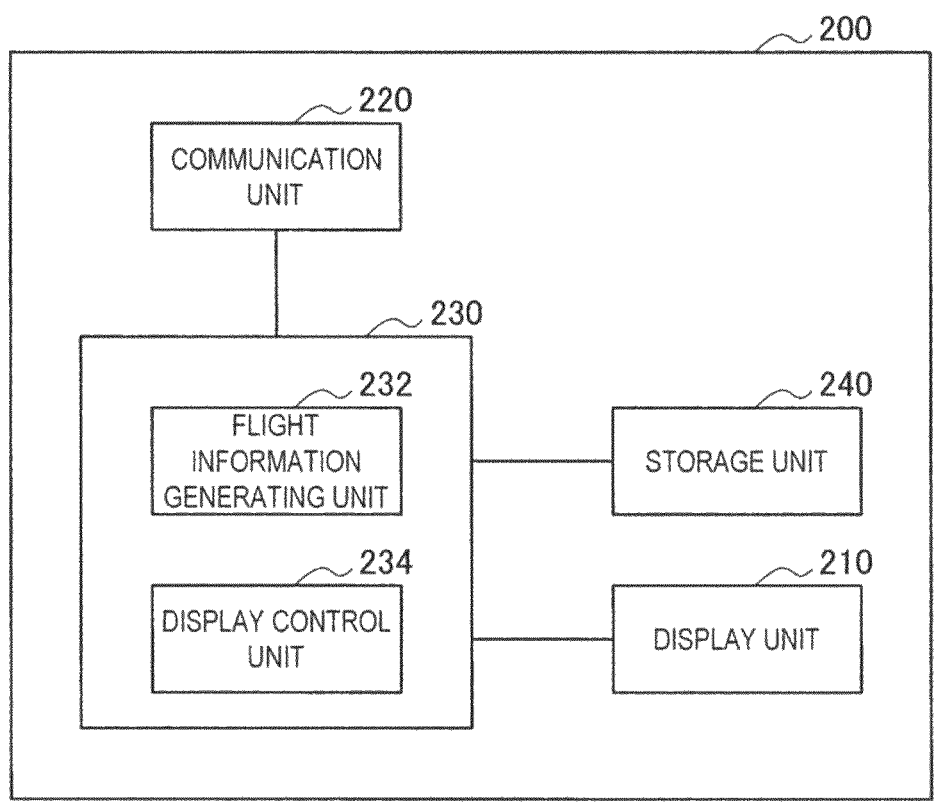
FIG. 4 is an explanatory diagram illustrating an exemplary functional configuration of a control terminal according to the embodiment of the present disclosure.

Next, an exemplary functional configuration of the control terminal 200 according to the present embodiment will be described based on FIG. 4. FIG. 4 is an explanatory diagram illustrating the exemplary functional configuration of the control terminal 200 according to the present embodiment. As illustrated in FIG. 4, the control terminal 200 according to the present embodiment is configured to include a display unit 210, a communication unit 220, a control unit 230, and a storage unit 240. The control terminal 200 includes a processor such as a CPU or a processing circuit, and as the processor or the processing circuit performs various programs and processes, functions of the display unit 210, the communication unit 220, and the control unit 230 are realized. In addition, the control terminal 200 includes, as the storage unit 240, a memory or a storage device which temporarily or permanently stores a program executed by the processor or the processing circuit and data read and written in processes.

The display unit 210 includes a flat display device, for example, a liquid crystal display device, an organic EL display device, or the like. The display unit 210 can display, for example, images captured by the imaging device 101 or information for controlling operations of the hovering camera 100. The display unit 210 is provided with a touch panel, and thus a user can perform a direct operation with respect to the information displayed on the display unit 210 by touching the display unit 210 with his or her finger, or the like.

The communication unit 220 transmits and receives information to/from the hovering camera 100 through wireless communication. The control terminal 200 receives images captured by the imaging device 101 from the hovering camera 100 using the communication unit 220. In addition, the control terminal 200 transmits instructions relating to the flight of the hovering camera 100 to the hovering camera 100 from the communication unit 220. Commands relating to the flight of the hovering camera 100 can be generated by the control unit 230.

The control unit 230 controls an operation of the control terminal 200. For example, the control unit 230 can control a process of displaying text, figures, images, or other information on the display unit 210 and the transmission and reception processes of information to/from other devices (for example, the hovering camera 100) through the communication unit 220. The control unit 230 is configured to include a flight information generating unit 232 and a display control unit 234.

The flight information generating unit 232 generates the flight information to be transmitted to the hovering camera 100. At the time of generation of the flight information, for example, the flight information generating unit 232 uses information related to a structure to be inspected stored in the storage unit 240 which will be described below. When the flight information is generated, the flight information generating unit 232 causes the generated flight information to be transmitted from the communication unit 220 before takeoff of the hovering camera 100.

Here, an example of the flight information generation process by the flight information generating unit 232 will be briefly described. The flight information generating unit 232 reads the overview diagram of the bridge 1 to be inspected when generating the flight information of the hovering camera 100. The read overview diagram of the bridge 1 is displayed on the display unit 210 through the display control unit 234. As described above, points on the overview diagram of the bridge 1 are associated with points on the map data including detailed GPS information in advance. The associating is preferably performed by at least two sets of points. The overview diagram of the bridge 1 is associated with points on the map data including detailed GPS information in advance, and thus the flight path of the hovering camera 100 is defined using GPS values (a set of a latitude and a longitude).

Then, the flight information generating unit 232 generates the flight path of the hovering camera 100 based on the overview diagram of the bridge 1. The flight information generating unit 232 uses information related to a structure such as a construction method, a width, and a span length of the bridge 1, an available flight period of time of the hovering camera 100, and information such as an inspection method of the bridge 1 when generating the flight path of the hovering camera 100. Concrete bridges are classified into reinforced concrete (RC) and prestressed concrete (PC) according to an reinforcement method and are classified into, for example, a RCT girder bridge, a PCT girder bridge, a PC hollow slab bridge, a RC box-girder bridge, a PC box-girder bridge, and the like. Thus, when the construction method of the bridge 1 serving as an inspection target is known, the flight information generating unit 232 can generate a flight path suitable for the construction method of the bridge 1. Then, the flight information generating unit 232 causes the flight path of the hovering camera 100 to be displayed on the overview diagram of the bridge 1 in a superimposed manner.

The flight information generating unit 232 defines the flight path of the hovering camera 100 using GPS values (a set of a latitude and a longitude) as described above. As the flight information generating unit 232 defines the flight path of the hovering camera 100 using the GPS values, the hovering camera 100 can determine a position at which the imaging process is executed at the time of flight based on the GPS values.

The display control unit 234 controls the display of text, figures, images, and other information on the display unit 210. For example, when the flight information generating unit 232 generates the flight information to be transmitted to the hovering camera 100, the display control unit 234 executes control such that the overview diagram of the structure (the bridge 1) to be inspected and the generated flight information are displayed on the display unit 210.

The storage unit 240 stores various types of information. Examples of the information stored in the storage unit 240 include information related to the structure to be inspected (the bridge 1). Examples of the information related to the structure to be inspected include the overview diagram of the structure (the bridge 1) to be inspected and the construction method of the structure to be inspected. Further, when a location of the structure to be inspected which is considered likely to be damaged is known in advance, the information related to the structure to be inspected may include information of a portion that is considered likely to be damaged.

Further, even when the information related to the structure (the bridge 1) to be inspected is not stored in the storage unit 240 in advance, the control terminal 200 may receive the information related to the structure of the inspection target, for example, from the information processing device 300 at the time of inspection of the structure.

The control terminal 200 according to the present embodiment has the configuration illustrated in FIG. 4 and can generate the flight information to be transmitted to the hovering camera 100 based on the information related to the structure (the bridge 1) to be inspected. Then the control terminal 200 may acquire the image captured based on the flight information by the hovering camera 100 that flies based on the flight information.

An exemplary functional configuration of the control terminal 200 according to the present embodiment has been described above.

4. Exemplary Operation of Inspection System

Figure 5:
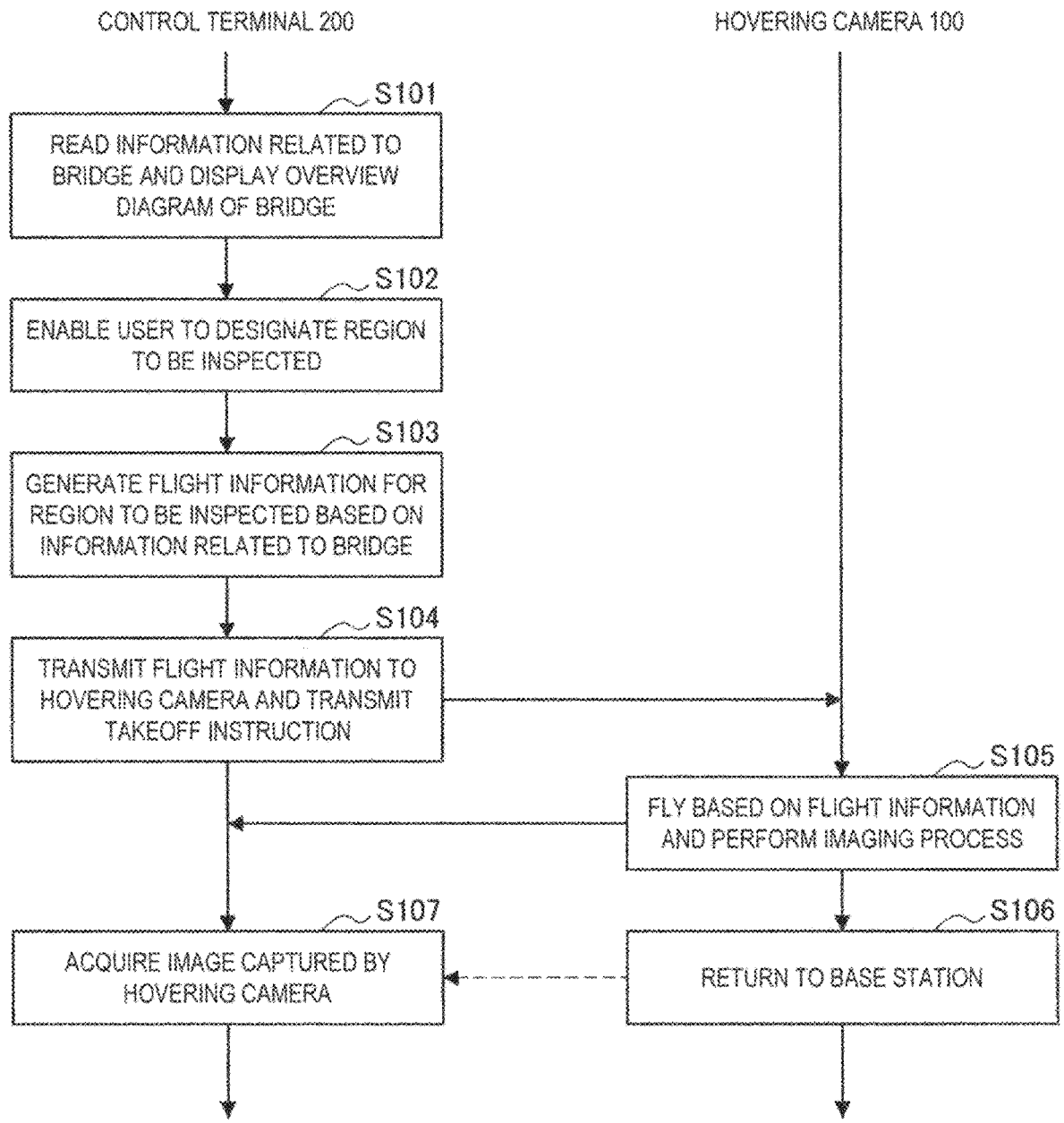
FIG. 5 is a flowchart illustrating an exemplary operation of the inspection system according to the embodiment of the present disclosure.

An exemplary operation of the inspection system 10 according to the present embodiment described above will be described based on FIG. 5. FIG. 5 is a flowchart illustrating the exemplary operation of the inspection system 10 according to the present embodiment. FIG. 5 illustrates the exemplary operation of the inspection system 10 according to the present embodiment when the bridge 1 is inspected by causing the hovering camera 100 to fly and the hovering camera 100 to image the bridge 1. Note that it is assumed that, when the bridge 1 is to be inspected using the hovering camera 100, the wireless relay node 400 and the position estimation nodes 500 are installed at suitable positions on the bridge 1 in advance.

First, the control terminal 200 that generates the flight information of the hovering camera 100 reads information related to the bridge 1 including the overview diagram of the bridge 1 of the inspection target, and causes the overview diagram of the bridge 1 to be displayed on the display unit 210 (step S101). The reading of the information related to the bridge 1 is executed, for example, by the flight information generating unit 232, and the displaying of the overview diagram of the bridge 1 on the display unit 210 is executed, for example, by the display control unit 234. The control terminal 200 in which the overview diagram of the bridge 1 is being displayed on the display unit 210 enables the user to designate a region of the bridge 1 to be inspected using the overview diagram of the bridge 1 being displayed on the display unit 210 (step S102). The process of enabling the user to designate the region in step S102 is executed, for example, by the flight information generating unit 232.

For example, when a part of the bridge 1 is set as the inspection target, the control terminal 200 enables the user to designate an inspection target region in the overview diagram of the bridge 1 being displayed on the display unit 210. Further, for example, when the entire bridge 1 is set as the inspection target, the control terminal 200 enables the user to designate all regions of the bridge 1 in the overview diagram of the bridge 1 being displayed on the display unit 210.

When the region of the bridge 1 to be inspected is designated by the user, the control terminal 200 then generates the flight information of the hovering camera 100 for the region to be inspected designated by the user based on the information related to the bridge 1 (step S103). The flight information generation process in step S103 is executed, for example, by the flight information generating unit 232.

The control terminal 200 uses information related to a structure such as a construction method, a width, and a span length of the bridge 1, an available flight period of time of the hovering camera 100, and information such as an inspection method of the bridge 1 when generating the flight information of the hovering camera 100 in step S103. For example, when a T girder is used in the construction method of the bridge 1, the control terminal 200 generates a flight path in which the hovering camera 100 repeats levitation and descending at the bottom side of the bridge 1 as the flight information. Further, the control terminal 200 may use information of an image target surface of the bridge 1 when generating the flight information of the hovering camera 100 in step S103. For example, when the user selects capturing of the side of the bridge 1, the control terminal 200 generates a flight path along the side of the bridge 1 as the flight information, and when the user selects capturing of the bottom surface of the bridge 1, the control terminal 200 generates a flight path in which it travels back and forth under the bottom side of the bridge 1 as the flight information.

When the flight information of the hovering camera 100 is generated in step S103, the control terminal 200 then transmits the generated flight information to the hovering camera 100, and transmits a takeoff instruction to the hovering camera 100 (step S104). The transmitting of the generated flight information and the transmitting of the takeoff instruction are performed, for example, by the flight information generating unit 232 through the communication unit 220.

The hovering camera 100 that has received the flight information and the takeoff instruction from the control terminal 200 and then taken off from the base station 600 flied based on the flight information transmitted from the control terminal 200, performs the imaging process, and acquires a still image (step S105). The hovering camera 100 acquires position information when the imaging process of acquiring a still image is executed or fuselage information at the time of the imaging process, and associates the acquired information with the still image. For example, information on the fuselage at the time of the imaging process may include, for example, an inclination of the hovering camera 100 with respect to the reference plane (for example, a yaw angle, a pitch angle, and a roll angle), acceleration, or an angular velocity. Further, the hovering camera 100 may transmit a moving image being captured by the imaging device 101 during flight to the control terminal 200 in a streaming manner. As the control terminal 200 acquires and displays on the display the moving image being captured through the imaging device during flight by the hovering camera 100, the control terminal 200 can present a position at which the hovering camera 100 is flying to the user.

Preferably, the hovering camera 100 maintains a constant distance from the image target surface (for example, the side surface or the bottom surface of the bridge girder 3) at all the imaging points when executing the imaging process. As the distance from the image target surface is maintained constant at all the imaging points, the hovering camera 100 can obtain still images captured with the same size.

When a portion considered likely to be damaged is included in the flight path of the hovering camera 100, the hovering camera 100 may change the imaging direction of the imaging device, use infrared rays having different wavelengths, or change a shutter speed for the portion and then capture a plurality of still images. Further, when a portion considered likely to be damaged is included in the flight path of the hovering camera 100, the hovering camera 100 may narrow an interval of positions at which the imaging process of the portion is performed so as to be smaller than that of other portions.

When the imaging process at the last imaging point is completed, the hovering camera 100 automatically flies to the base station 600 in order to return to the base station 600 (step S106). Then, the control terminal 200 acquires the image captured by the hovering camera 100 that has returned to the base station 600 from the hovering camera 100 (step S107). The acquiring of the image captured by the hovering camera 100 may be performed after the hovering camera 100 returns to the base station 600 as described above, but the control terminal 200 may acquire a still image sequentially each time the hovering camera 100 executes the imaging process and acquires the still image.

An exemplary operation of the inspection system 10 according to the present embodiment has been described above. According to the inspection system 10 according to the present embodiment, the control terminal 200 generates the flight information to be transmitted to the hovering camera 100 and the hovering camera 100 can capture images based on the flight information.

5. Application to Acquisition of Highly Precise Images

By causing the hovering camera 100 to fly and the hovering camera 100 to capture the bridge 1, a state of a place which is not easily accessible to a worker, for example, the bottom surface of the bridge girder 3 can be checked. Here, an image acquired by the imaging device 101 here is required to be a highly precise image with which a detection target such as damage of a structure can be precisely detected. Thus, in order for the hovering camera 100 according to the present embodiment to acquire highly precise images, the control unit 110 first performs illuminating control on the illuminating device 105 to make the illuminance of the photographing range of the imaging device 101 substantially uniform.

In addition, there is a concern in photographing using the hovering camera 100 that the fuselage may vibrate due to a disturbance of wind or the like, or operations of the driving system of the fuselage and thus photographed images may appear blurry. Thus, in the hovering camera 100 according to the present embodiment, the control unit 110 performs a process of eliminating an influence of vibration on the imaging device 101 and preventing captured images from being blurry. The process for acquiring a highly precise image with the hovering camera 100 according to the present embodiment will be described in detail below.

[5.1. Functional Configuration]

Figure 6:
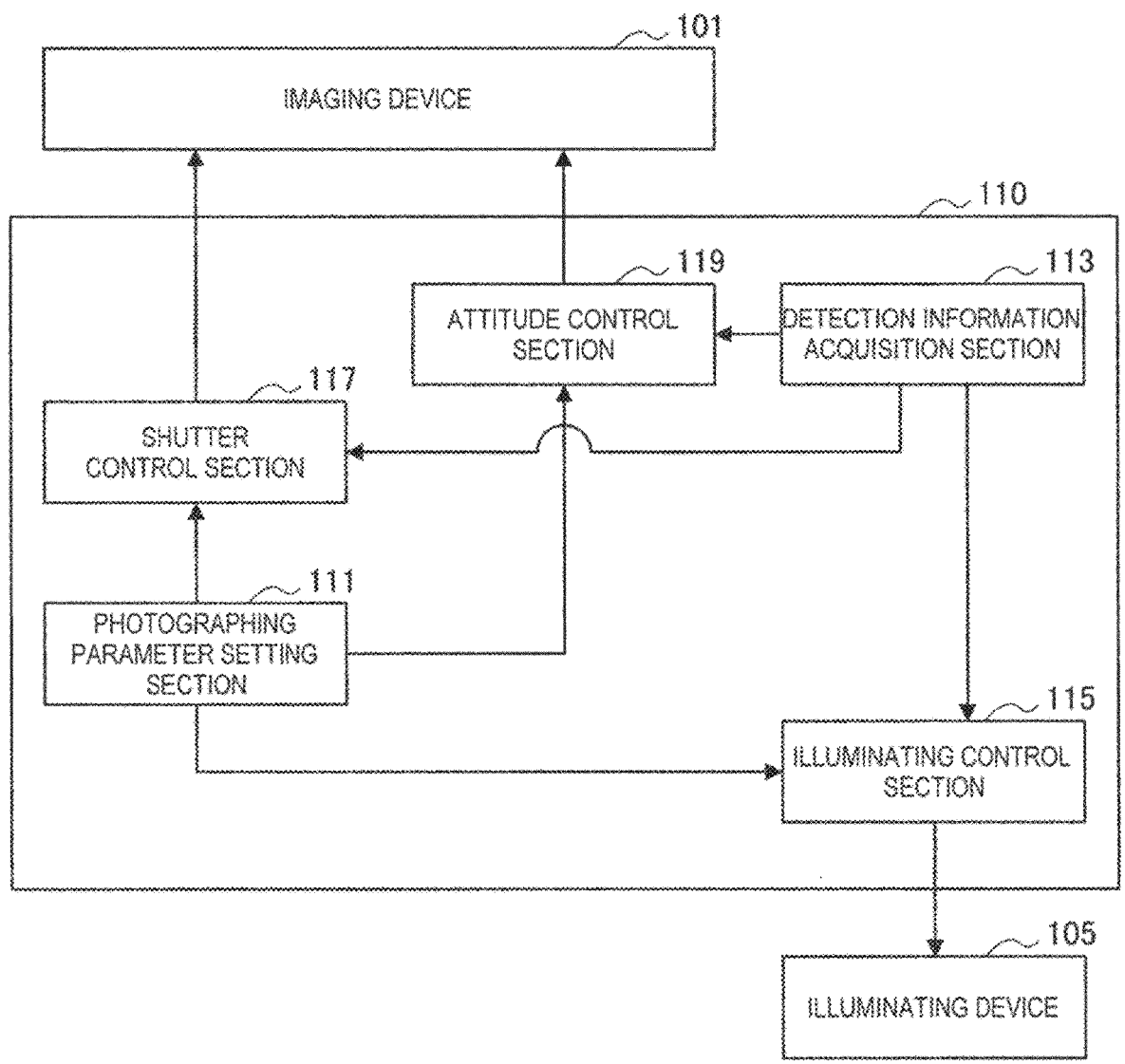
FIG. 6 is a function block diagram illustrating an example of functions for acquiring highly precise images of a control unit of the hovering camera according to the embodiment of the present disclosure.

First, functions of the control unit 110 for acquiring highly precise images with the hovering camera 100 according to the present embodiment will be described based on FIG. 6. Note that FIG. 6 is a function block diagram illustrating an example of the functions for acquiring highly precise images of the control unit 110 of the hovering camera 100 according to the present embodiment. Note that, for the function of acquiring highly precise images, the control unit of the hovering camera according to the present disclosure may not necessarily have all the functions illustrated in FIG. 6, and may have at least any one function.

The control unit 110 of the hovering camera 100 according to the present embodiment has a photographing parameter setting section 111, a detection information acquisition section 113, an illuminating control section 115, a shutter control section 117, and an attitude control section 119 for the functions for acquiring highly precise images as illustrated in FIG. 6. The functions of the photographing parameter setting section 111, the detection information acquisition section 113, the illuminating control section 115, the shutter control section 117, and the attitude control section 119 are realized by a processor such as a CPU or a processing circuit performing various programs and processes.

The photographing parameter setting section 111 sets photographing parameters of the imaging device 101 and the illuminating device 105. The photographing parameters include, for example, a shutter speed and a photographing gain of the imaging device 101, a set illuminance of the illuminating device 105, and the like. The photographing parameters are set in advance in, for example, the storage unit 140 of the hovering camera 100. The photographing parameter setting section 111 acquires photographing parameters necessary for obtaining an image quality required for a captured image from the storage unit 140 and outputs them to the illuminating control section 115, the shutter control section 117, and the attitude control section 119 such that they are set for the imaging device 101 and the illuminating device 105.

The detection information acquisition section 113 acquires position information of the fuselage and fuselage information at the time of imaging acquired by the sensor unit 130 and the position information acquisition unit 132 of the hovering camera 100. The detection information acquisition section 113 outputs the acquired various kinds of information to the illuminating control section 115, the shutter control section 117, and the attitude control section 119.

The illuminating control section 115 modulates light such that the illuminance of the photographing range of the imaging device 101 illuminated by the illuminating device 105 becomes substantially uniform. The illuminating control section 115 controls the illuminating device 105 such that the illuminating device is turned on and off based on the position information of the fuselage and the fuselage information at the time of imaging of the hovering camera 100 acquired by the detection information acquisition section 113. In addition, the illuminating control section 115 controls a light amount of the light sources constituting the illuminating device 105 according to an inclination of the fuselage included in the fuselage information to attain the set illuminance input from the photographing parameter setting section 111.

The shutter control section 117 controls driving of the shutter of the imaging device 101. The shutter control section 117 causes the shutter to be driven based on, for example, a shutter speed input from the photographing parameter setting section 111. In addition, the shutter control section 117 controls timings at which the shutter is caused to be driven based on the position information of the fuselage, the fuselage information at the time of imaging of the hovering camera 100, and the like acquired by the detection information acquisition section 113.

The attitude control section 119 controls inclinations of the lens of the imaging device 101. Accordingly, the attitude control section 119 can control the imaging device 100 such that a photographing direction is oriented to an imaging range according to an attitude of the hovering camera 100. For example, when the fuselage of the hovering camera 100 is inclined with respect to a photographing plane because it is influenced by a disturbance like wind, the attitude control section 119 controls a driving mechanism for adjusting inclinations of the lens of the imaging device 101 such that the photographing direction is substantially vertical with respect to the photographing plane.

The respective functional sections of the control unit 110 control at least one of the imaging device 101 and the illuminating device 105 as described above so that highly precise images can be acquired. Control processes of the respective functional sections will be described below.

[5.2. Light Modulation Control of Illuminating Device]

Figure 7:
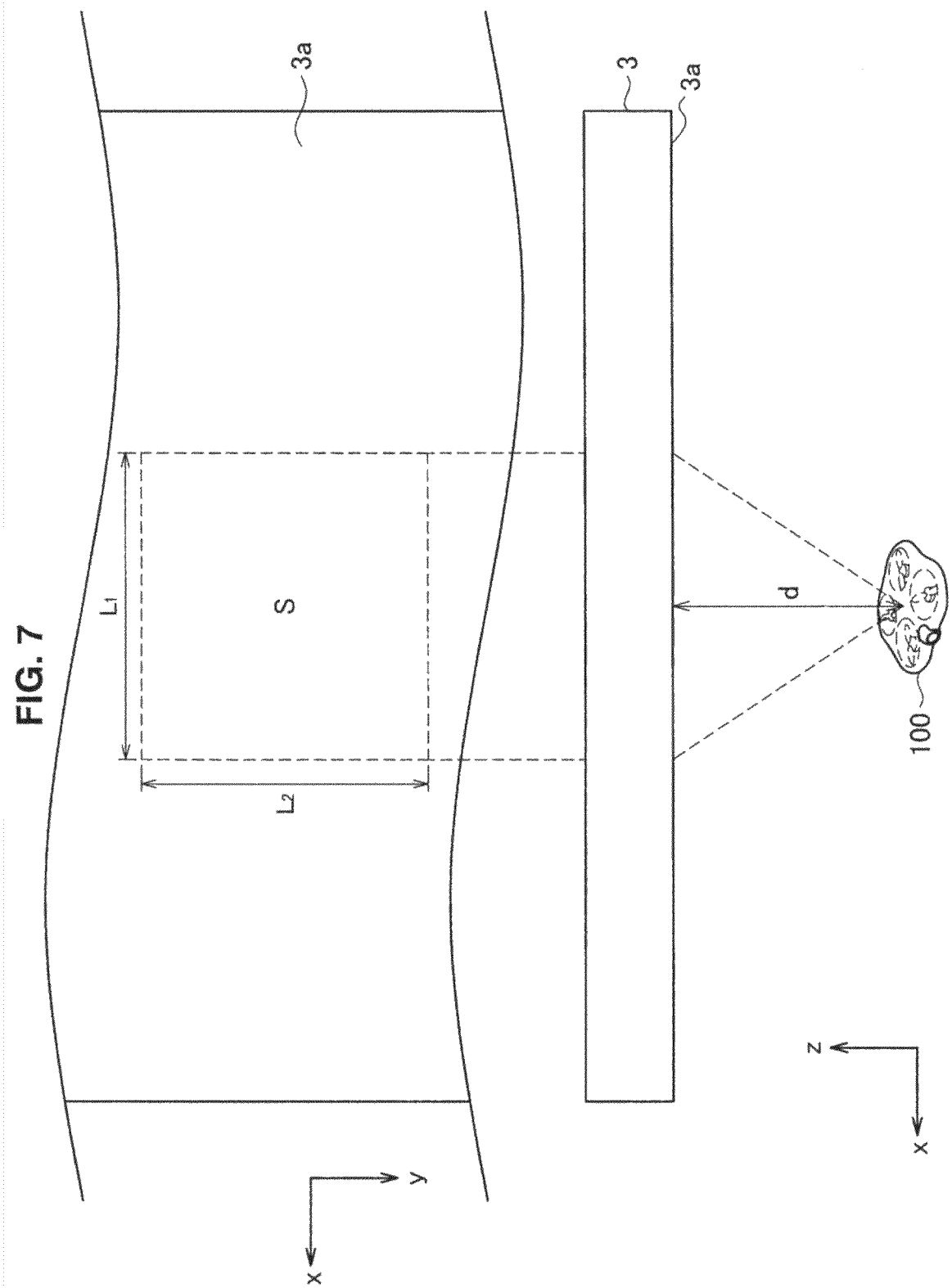
FIG. 7 is an explanatory diagram illustrating an example of a photographing range of an imaging device of the hovering camera according to the embodiment of the present disclosure.
Figure 8:
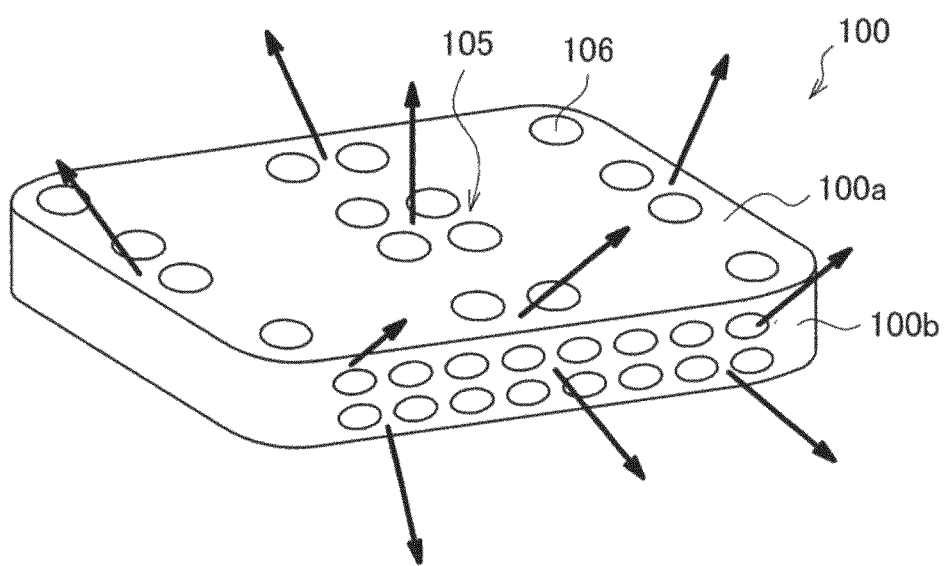
FIG. 8 is an explanatory diagram illustrating an exemplary disposition of light sources constituting an illuminating device according to the embodiment of the present disclosure.
Figure 9:
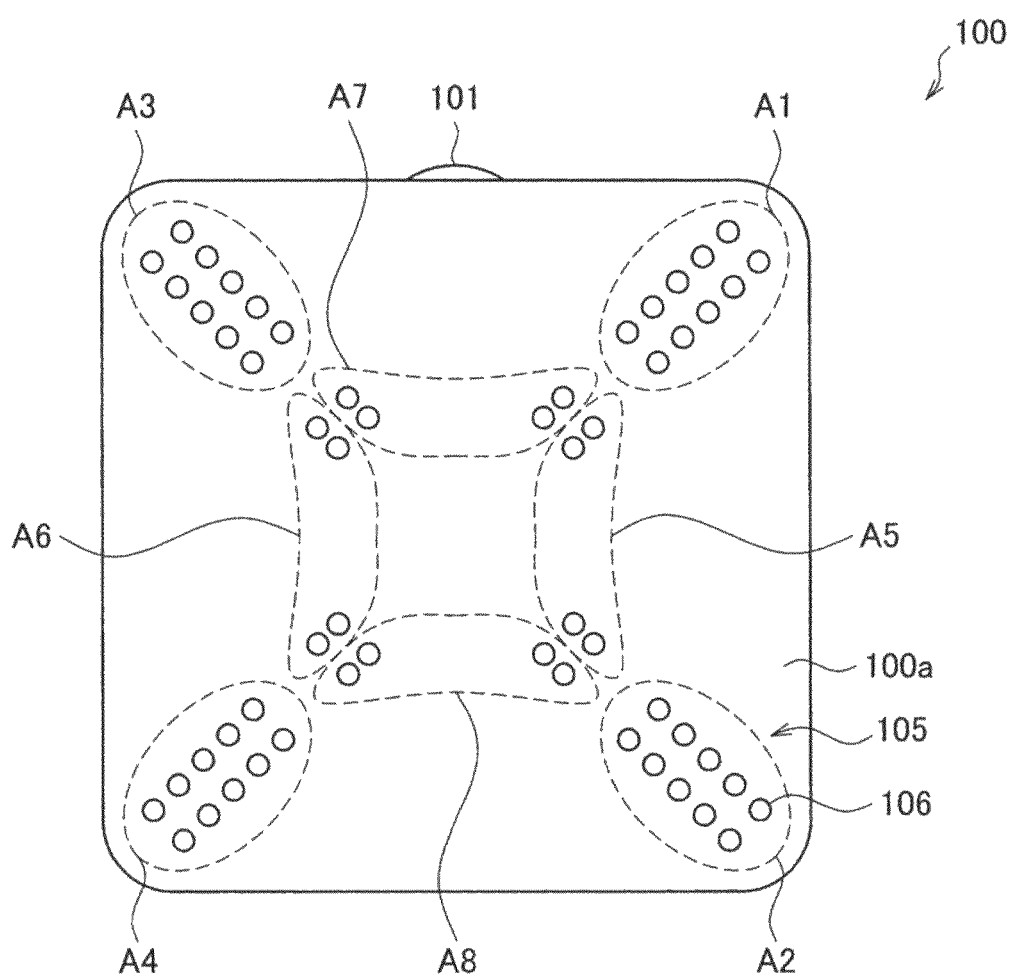
FIG. 9 is an explanatory diagram illustrating another exemplary disposition of the light sources constituting the illuminating device according to the embodiment of the present disclosure.
Figure 10:
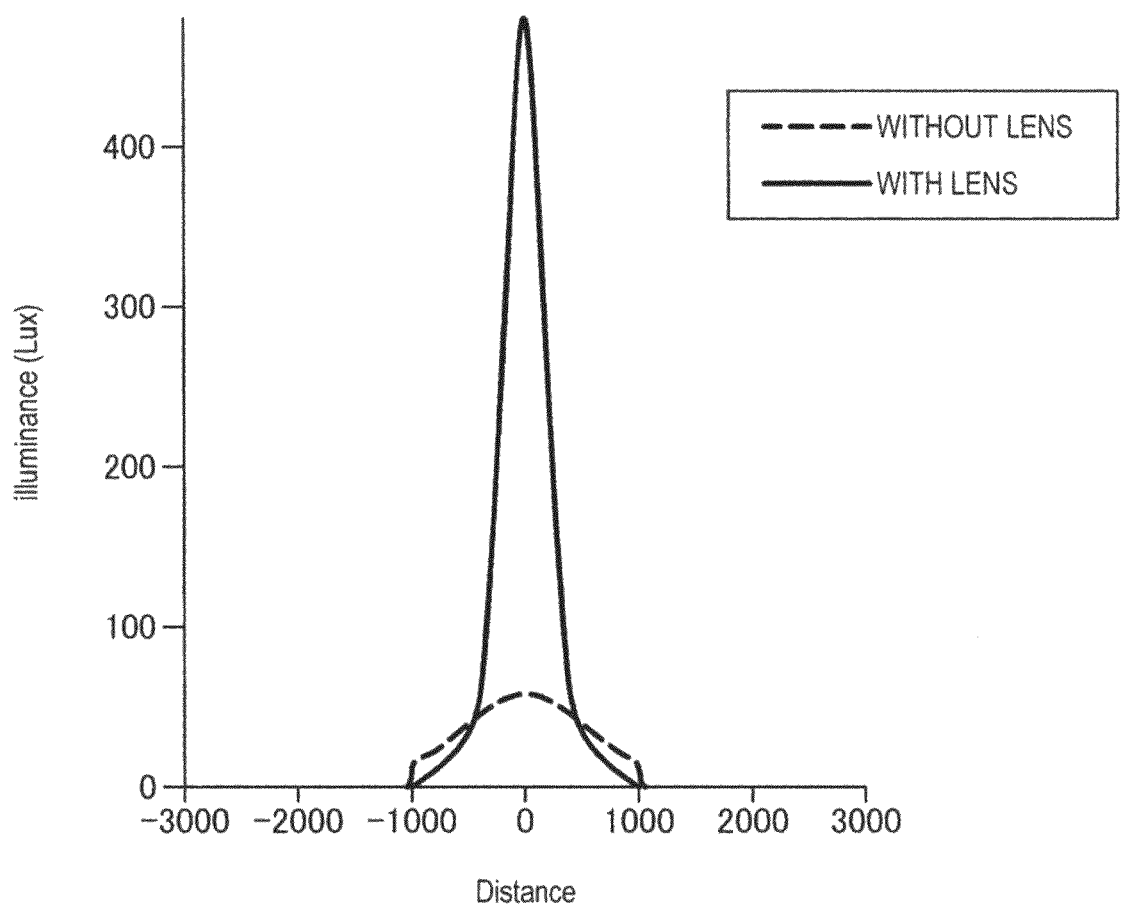
FIG. 10 is an explanatory diagram illustrating exemplary characteristics of the light sources constituting the illuminating device.
Figure 11:
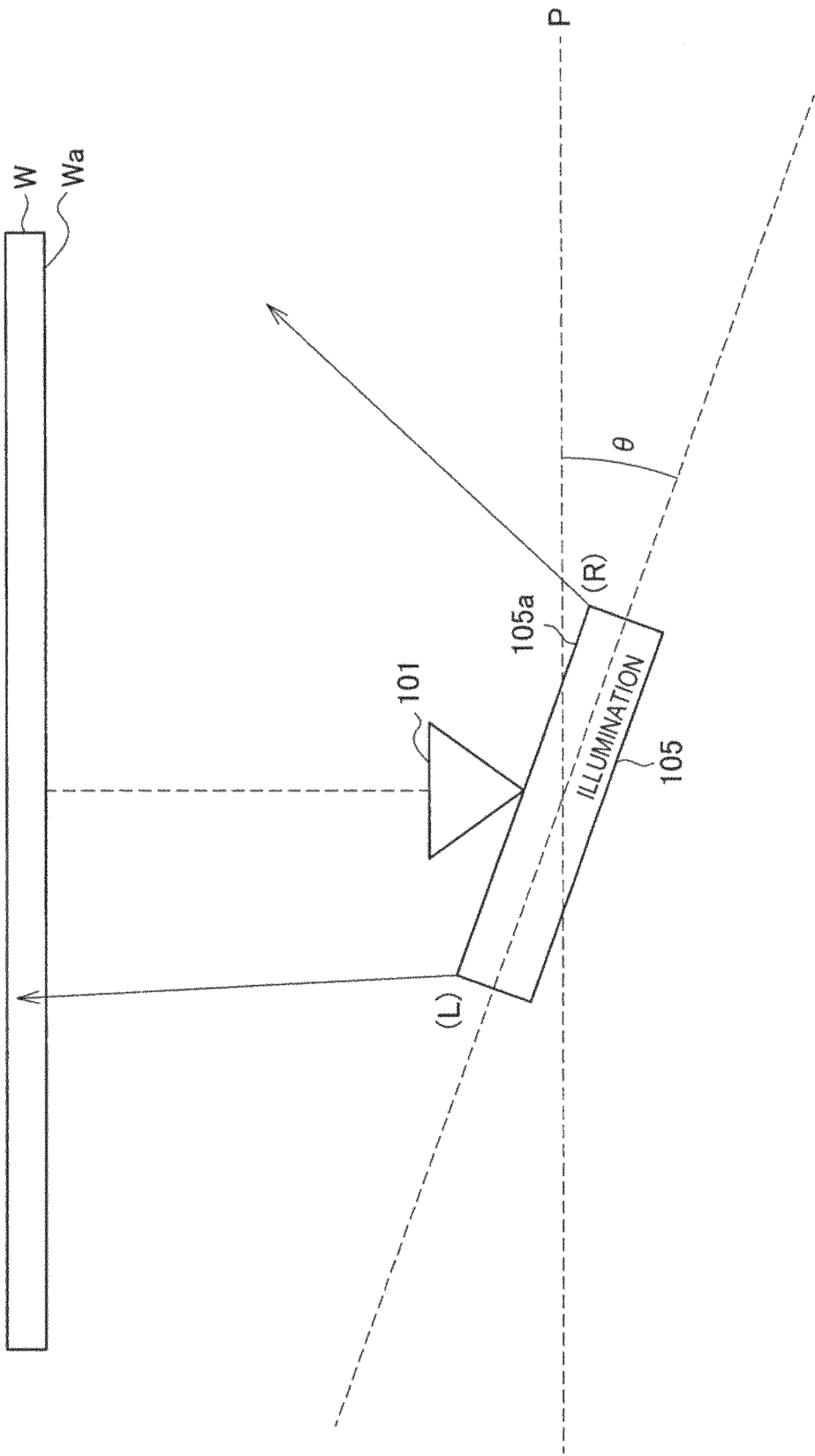
FIG. 11 is an explanatory diagram illustrating a state in which the illuminating device is inclined by an angle θ with respect to an illuminated surface.

First, light modulation control of the illuminating device 105 according to the present embodiment will be described based on FIGS. 7 to 12. Note that FIG. 7 is an explanatory diagram illustrating an example of a photographing range of the imaging device 101 of the hovering camera 100 according to the present embodiment. FIG. 8 is an explanatory diagram illustrating an exemplary disposition of light sources 106 constituting the illuminating device 105 according to the present embodiment. FIG. 9 is an explanatory diagram illustrating another exemplary disposition of the light sources 106 constituting the illuminating device 105 according to the present embodiment. FIG. 10 is an explanatory diagram illustrating exemplary characteristics of the light sources constituting the illuminating device 105. FIG. 11 is an explanatory diagram illustrating a state in which the illuminating device 105 is inclined by an angle θ with respect to an illuminated surface. FIG. 12 is an explanatory diagram illustrating changes in illuminance of the surface illuminated by the illuminating device 105 when the hovering camera 100 is in the state of FIG. 11.

(1) Photographing Conditions

It is required to acquire an image having a certain level of precision in order to photograph a structure with the hovering camera 100 according to the present embodiment and detect damage of the structure. For example, a case in which a back face 3a of the bridge girder 3 is photographed to detect a crack having a certain degree of size or greater generated on the back face 3a is considered as illustrated in FIG. 7. A certain level of resolution applicable to pixels of a photographed image is necessary for detecting cracks having a certain degree of size or greater.

It may be assumed that, for example, a crack having a width of 0.2 mm or greater is detected using the imaging device 101 having about 4000 pixels (13 M pixels) horizontally and 90° as an angle of view. In this case, by photographing a photographing range S with an area of 4 m² ($L_1=L_2=2$ m) at a distance d from the imaging device 101 to the back face 3a of the bridge girder 3 serving as the photographing plane, which is 1 m, an image having the required resolution can be acquired.

On the other hand, it is required that a photographing target is clearly projected with no blurring in an image to be used to detect damage of a structure. Thus, when an image having the above-described resolution is to be acquired, an exposure time in which no blurring is caused in the image (i.e., a shutter speed), a gain for obtaining a clear image (i.e., ISO sensitivity), and a necessary illuminance of the photographing plane in photographing are acquired in advance as photographing parameters.

Here, the exposure time is set to a value at which an influence of vibration of the fuselage of the hovering camera 100 can be eliminated. In normal photographing in which a person photographs an image using a digital still camera, a vibration frequency of hand-shake of a photographer is about 10 Hz. On the other hand, a vibration frequency of the fuselage of the hovering camera 100 has a plurality of peaks according to the rotational speed of the propeller that rotates at several hundreds Hz. For this reason, it is not possible to remove blurring of an image caused by vibration of the fuselage with a general hand-shake correction function incorporated into a lens module of the imaging device 101. Thus, it is desirable to set the exposure time according to the fuselage of the hovering camera 100.

The photographing parameters may be set based on real measurement results using a real machine for the hovering camera 100, or may be set based on results obtained from a simulation based on a model simulating the real machine. The photographing parameters are stored in, for example, the storage unit 140.

When, for example, the photographing range S of 4 m² is photographed with the distance from the imaging device 101 to the photographing plane set to 1 m, the exposure time is set to 1/250 [sec], the gain to ISO 200, and an illuminance at the time of photographing to 1000 [lux] for the photographing parameters. Note that these values of the photographing parameters are merely examples, and the photographing parameters are set according to photographing conditions, the stability of the fuselage of the hovering camera 100, and the like. If the stability of the fuselage of the hovering camera 100 increases, for example, the exposure time can be set to be longer, and the illuminance at the time of photographing can be lowered.

The control unit 110 controls the imaging device 101 and the illuminating device 105 such that photographing is performed according to the photographing parameters set by the photographing parameter setting section 111.

(2) Configuration of Illuminating Device

Next, a configuration of the illuminating device 105 mounted in the hovering camera 100 according to the present embodiment will be described based on FIGS. 8 to 10. The illuminating device 105 of the hovering camera 100 according to the present embodiment is a device that illuminates the photographing range S, and is used to realize an illuminance set as a photographing parameter in the photographing range S even in an environment in which a sufficient illuminance is not obtained due to sunlight.

The illuminating device 105 may be configured by disposing the plurality of light sources 106 on the fuselage surface of the hovering camera 100. As the light sources 106, for example, LED light sources can be used. Since LED light sources have directionality, reliable illumination is possible in a light emission direction. In addition, the respective light sources 106 may be disposed to have a substantially uniform illuminance distribution in the photographing range S. It is preferable to set the illuminance distribution in the photographing range to be higher than a necessary illuminance at all points within the photographing range S.

The illuminating device 105 may be configured such that the light sources 106 are disposed at the center, four corners, and the center portions of respective sides of a fuselage flat surface 100a of the hovering camera 100 having a substantial square shape, as illustrated in FIG. 8, for example. Furthermore, the light sources 106 may also be disposed on a fuselage side surface 100b of the hovering camera. Note that the light sources 106 can also be installed at any position on fuselage surfaces of the hovering camera 100, and may be provided on the fuselage bottom surface, in addition to the fuselage flat surface 100a and the fuselage side surface 100b. In addition, the light sources 106 may be provided on a surface facing a photographing target in a two-dimensional array shape as illustrated in FIG. 8.

At this time, the illuminance distribution in the photographing range S can be made substantially uniform by appropriately setting an emission direction of the light sources 106 according to an installation position of the light sources 106. For example, a light emission direction of the light sources 106 provided at the center among the light sources 106 disposed on the fuselage flat surface 100a may be substantially vertical with respect to the fuselage flat surface 100a as illustrated in FIG. 8. On the other hand, a light emission direction of the light sources 106 provided around the fuselage flat surface 100a may be set to be inclined from the direction vertical with respect to the fuselage flat surface 100a toward outside of the fuselage.

In addition, as another exemplary configuration of the illuminating device 105, for example, the illuminating device 105 may be configured by disposing the light sources 106 on diagonal lines of the fuselage flat surface 100a of the hovering camera 100 having a substantially square shape, as illustrated in FIG. 9. Also in this case, directionality of each of the light sources 106 may be appropriately changed to make the illuminance distribution be substantially uniform in the photographing range S, similar to the illuminating device 105 of FIG. 8.

Here, as a method of setting the illuminance distribution of the illuminating device 105 in the photographing range S to be substantially uniform, for example, a lens (not illustrated) that is an optical member which adjusts a directionality of the light sources 106 may be provided for the light sources 106, in addition to adjusting a light emission direction of the light sources 106. For example, FIG. 10 illustrates an example of a difference in directionality and illuminance of the light sources 106 when a lens that can reduce a directional angle and increase illuminance is provided in a light emission direction of the light sources 106 and the light sources 106 without the lens. As illustrated in FIG. 10, while the light sources 106 without the lens have directionality but do not have a high peak in their illuminance, the light sources 106 using the lens exhibit a significant peak in their illuminance and thus can radiate intense light to a specific portion.

By changing the directionality of the light sources 106 and increasing illuminance of radiated light using the lens as described above, the illuminance distribution in the photographing range S can be made substantially uniform. Particularly, with regard to the hovering camera 100 according to the present embodiment, a light amount of the illuminating device 105 is adjusted according to an inclination of the fuselage, and thus the illuminance distribution in the photographing range S is made substantially uniform as will be described below.

Specifically, by providing a lens that changes directionality and increasing illuminance of radiated light in at least some of the light sources 106 constituting the illuminating device 105 of the hovering camera 100, the illuminance distribution in the photographing range S can be more precisely made substantially uniform. For example, in the example of the illuminating device 105 illustrated in FIG. 9, a lens for changing directionality and increasing illuminance of radiated light may be provided in the light sources 106 disposed in regions A1 to A4 close to the four corners among the light sources 106 disposed on the diagonal lines of the fuselage flat surface 100a. In addition, no lens may be provided for the light sources 106 disposed in regions A5 to A8 close to the center of the hovering camera.

Note that, although the fuselage of the hovering camera 100 is shown to be a simplified quadrangular body with regard to the illuminating device 105 illustrated in FIGS. 8 and 9, a real hovering camera 100 may have a curved surface as its fuselage surface. In this case, a light emission direction of the respective light sources 106 constituting the illuminating device 105 may be appropriately set according to the surface shape of the fuselage. In addition, the lens for changing directionality of the light sources 106 introduced in the above example is an example, and characteristics of a lens to be used (a directional angle, peak illuminance, or the like to be adjusted with the lens) are not limited to the above example. Furthermore, a lens having a plurality of characteristics may be used to configure light sources 106 having a plurality of different directionalities and to make the illuminance distribution in the photographing range S substantially uniform with a combination thereof.

(3) Light Amount Control of Illuminating Device According to Inclination of Fuselage The hovering camera 100 according to the present embodiment modulates a light amount of the illuminating device 105 according to an inclination of the fuselage with the control unit 110. Although the illuminating device 105 according to the present embodiment is designed to have a substantially uniform illuminance distribution in the photographing range S as described above, if the fuselage is in an inclined state resisting wind or the like, it may not be possible for the illuminating device 105 to realize a target illuminance distribution in the photographing range S at a photographing position. For example, although attitude control is performed during photographing such that the fuselage flat surface 100a of the hovering camera 100 is substantially parallel to the photographing plane while maintaining a set distance d therefrom, the hovering camera 100 may be inclined due to, for example, the influence of wind, or the like. Then, the fuselage flat surface 100a of the hovering camera 100 is inclined with respect to the photographing plane, and for the light sources 106 provided in the outer circumferential part of the fuselage flat surface 100a, a distance from the light sources 106 to the photographing plane may become longer than the set distance d.

Therefore, the control unit 110 controls a light amount of the illuminating device 105 such that an illuminance distribution in the photographing range S is substantially uniform at a photographing position according to an inclination of the fuselage of the hovering camera 100 sensed by the sensor unit 130 mounted in the fuselage. Since the illuminating device 105 may be fixed to the fuselage and only the inclination of the imaging device 101 may be adjusted, a driving mechanism of operable parts of the hovering camera 100 can be simplified, and as a result, the hovering camera 100 can be lightweight.

Light amount control of the illuminating device 105 will be described in more detail based on FIGS. 11 and 12. Light amount control according to an inclination of the fuselage of the hovering camera 100 when the fuselage is inclined with respect to a horizontal reference plane and light amount control according to an inclination of the fuselage of the hovering camera 100 with respect to a photographing target will be described below. Note that FIG. 11 schematically illustrates the imaging device 101 and the illuminating device 105 of the hovering camera 100. In FIG. 11, although the imaging device 101 is illustrated on a light emission plane 105a of the illuminating device 105 in order to facilitate understanding of the imaging direction of the imaging device 101, an installation position of the imaging device 101 is not limited to that position, and may be on, for example, one side surface of the hovering camera 100 as illustrated in FIG. 2.

First, light amount control according to an inclination of the hovering camera 100 when the fuselage is inclined with respect to a horizontal reference plane will be described. The control is executed when, for example, the back face portion of the bridge girder 3 of the bridge 1 is substantially parallel with the horizontal plane as illustrated in FIG. 1 and the fuselage of the hovering camera 100 is inclined with respect to this back face portion.

First, the control unit 110 acquires an inclination of the fuselage of the hovering camera 100 based on information acquired by the sensor unit 130. At this time, the control unit 110 determines whether or not the hovering camera 100 is inclined with respect to a photographing plane of a photographing target using sensing information of the laser range finders provided at a plurality of places on the hovering camera 100 as the information from the sensor unit 130. Whether or not the hovering camera 100 is inclined with respect to the photographing plane of the photographing target may be determined based on, for example, whether distances measured by the plurality of laser range finders provided on the same plane of the hovering camera 100 include at least one different value.

When the distances measured by the respective laser range finders are substantially the same (for example, when differences between the respective distances are within a predetermined range), the illuminance distribution in the photographing range S is determined to be substantially uniform, and thus the control unit 110 decides not to perform light amount control of the illuminating device 105. On the other hand, when the distances measured by the respective laser range finders include at least one different value, the control unit 110 determines the hovering camera 100 to be inclined with respect to the photographing plane of the photographing target. Then, the control unit 110 acquires the angle θ by which the light emission plane 105a is inclined with respect to a horizontal plane P with reference to the horizontal plane P because the photographing plane of the photographing target is substantially parallel with the horizontal plane in the present example. The angle θ can be acquired using, for example, acceleration information of the acceleration sensor or angular velocity information of the gyro sensor as the information from the sensor unit 130.

If the light emission plane 105a is inclined with respect to the horizontal plane P by the angle θ, an irregular illuminance distribution of light radiated from the illuminating device 105 occurs on the photographing plane Wa that is substantially parallel with the horizontal plane P. For example, in FIG. 11, the right side (R) with respect to the paper surface is inclined such that it is more distant from the photographing plane Wa (i.e., the left side (L) with respect to the paper surface approaches the photographing plane Wa). At this moment, if the light amount of the light sources 106 disposed on the right side (R) is assumed to be the same as the light amount of the light sources disposed on the left side (L), it is more difficult for light of the light sources 106 on the right side (R) distant from the photographing plane Wa to reach the photographing plane Wa than light from the light sources on the left side (L). Therefore, the right side (R) has a lower illuminance distribution than the left side (L) on the photographing plane Wa, and thus illuminance is not substantially uniform in the photographing range S.

Thus, by adjusting a light amount of the light sources 106 constituting the illuminating device 105 according to the inclination angle θ of the light emission plane 105a with respect to the horizontal plane P, an illuminance distribution on the photographing plane Wa becomes substantially uniform in the present embodiment. FIG. 12 illustrates light output ratios of the light sources 106 of the illuminating device 105 when an inclination angle of the light emission plane 105a with respect to the horizontal plane P is set to, for example, 20°, and differences of illuminance in an upper right region and an upper left region of the photographing range S on the photographing plane Wa. Here, the photographing range S was divided into five regions including a center region C, and an upper right region UR, an upper left region UL, a lower right region BR, and a lower left region BL that were formed by dividing the photographing range S in the left, right, upper, and lower directions.

Thus, with regard to the light sources 106 facing the right regions (the upper right region UR and the lower right region BR) and the light sources 106 facing the left regions (the upper left region UL and the lower left region BL), a light output ratio was changed and then the illuminance difference between the upper right region UR and the upper left region UL at that time was measured. Note that characteristics of the respective light sources 106 constituting the illuminating device 105 are set to be the same, and an adjustment amount of a light amount of the respective light sources 106 is expressed as a ratio when a light amount that the light sources 106 can output at a maximum rating is set to 100%. The result is shown in the graph in the lower part of FIG. 12.

As illustrated in the lower part of FIG. 12, first, light output ratios of all the light sources 106 facing the right regions and light sources 106 facing the left regions were assumed to be 50%, and all the light sources 106 constituting the illuminating device 105 were assumed to emit the same amount of light. At that time, the illuminance difference between the upper right region UR and the upper left region UL was 83 [lux]. Thereafter, when the light output ratio of the light sources 106 facing the left regions was gradually reduced while the light output ratio of the light sources 106 facing the right regions was gradually increased, the illuminance difference between the upper right region UR and the upper left region UL became smaller as illustrated in the lower part of FIG. 12. In addition, it was ascertained that, when the light output ratio of the light sources 106 facing the right regions was set to 85% and the light output ratio and the light sources 106 facing the left regions was set to about 25%, the illuminance difference between the upper right region UR and the upper left region UL in the photographing range S became substantially zero.

If a light amount of the light sources 106 is adjusted so that illuminance differences between respective regions in the photographing range S become zero, an illuminance distribution in the photographing range S can be made substantially uniform.

The hovering camera 100 stores in the storage unit 140 in advance an output value of the respective light sources 106 at which the illuminance differences between the respective regions of the photographing range S are a predetermined value or smaller for each inclination angle θ of the light emission plane 105a with respect to the horizontal plane P. The set output value of the respective light sources 106 may be decided based on, for example, a result of measurement obtained using a real machine, or may be decided based on a simulation result. The control unit 110 of the hovering camera 100 acquires from the storage unit 140 a set value of the illuminating device 105 corresponding to the inclination of the fuselage acquired from the results of measurement of the sensor unit 130, and controls an output (light amount) of the respective light sources 106 of the illuminating device 105 using the illuminating control section 115.

Note that the illuminating control section 115 may control each of the light sources 106 constituting the illuminating device 105, or control the respective light sources 106 for each of predetermined groups. In the case of the illuminating device illustrated in FIG. 9, for example, the light sources may be controlled for each of eight regions A1 to A8.

On the other hand, a light amount may be controlled according to an inclination of the fuselage of the hovering camera 100 with respect to a photographing target. When, for example, a photographing target such as the back side portion of the bridge girder of the bridge is inclined with respect to a horizontal plane and the fuselage of the hovering camera 100 is inclined as well with respect to the photographing target, the inclination of the fuselage of the hovering camera 100 with respect to the photographing target may be calculated as described below and thereby a light amount of the illuminating device 105 may be controlled.

Also in this case, the control unit 110 acquires the inclination of the fuselage of the hovering camera 100 based on the information acquired from the sensor unit 130. The inclination of the fuselage of the hovering camera 100 may be performed using sensing information of the laser range finders provided at a plurality of places on the hovering camera 100 as the information from the sensor unit 130 similarly to above. When all distances measured by the respective laser range finders are not substantially the same, the fuselage of the hovering camera 100 is determined to be inclined with respect to the photographing plane of the photographing target.

When the fuselage of the hovering camera 100 is inclined with respect to the photographing plane of the photographing target, the control unit 110 calculates the inclination angle of the fuselage of the hovering camera 100 with respect to the photographing target, and uses it in control of a light amount of the illuminating device 105. The inclination angle of the fuselage of the hovering camera 100 with respect to the photographing target can be acquired from, for example, when the inclination of the photographing plane of the photographing target with respect to the horizontal plane P is known, the inclination of the photographing plane of the photographing target with respect to the horizontal plane P and the inclination of the fuselage with respect to the horizontal plane P acquired using the gyro sensor. Alternatively, the inclination angle of the fuselage of the hovering camera 100 with respect to the photographing target may be acquired geometrically from distances measured by the plurality of laser range finders.

When the inclination angle of the hovering camera 100 with respect to the photographing target is acquired, the control unit 110 acquires the set value of the illuminating device 105 corresponding to the inclination of the fuselage from the storage unit 140, and then controls an output (light amount) of the respective light sources 106 of the illuminating device 105 using the illuminating control section 115. Note that the set value stored in the storage unit 140 may be the same as information used when light amount control is performed based on the inclination angle θ of the fuselage with respect to the horizontal plane P as described above.

[5.3. Exemplary Control of Imaging Device and Illuminating Device at Time of Photographing]

Figure 13:
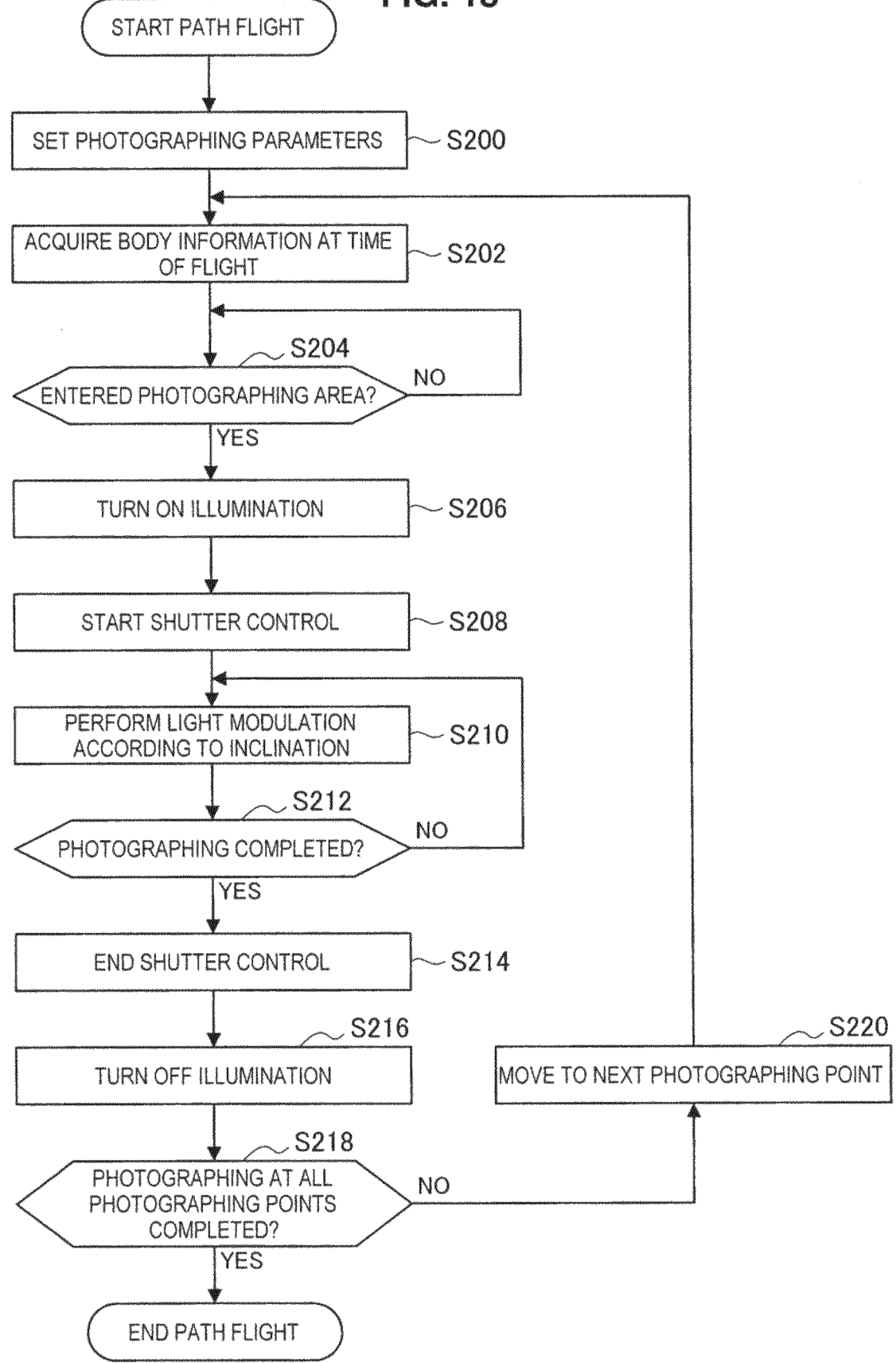
FIG. 13 is a flowchart of exemplary control of the imaging device and the illuminating device at the time of photographing of the hovering camera according to the embodiment of the present disclosure.
Figure 14:
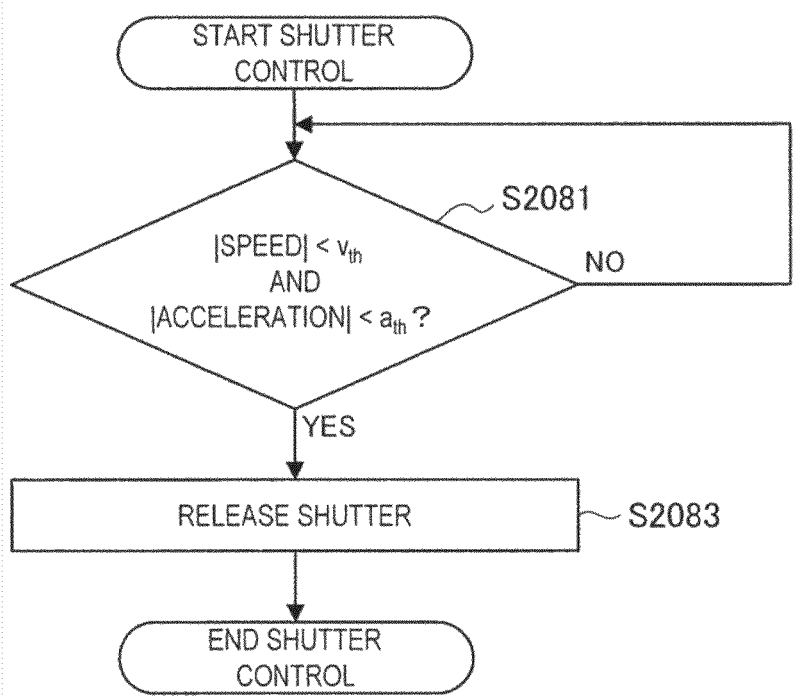
FIG. 14 is a flowchart for describing an example of shutter control of the imaging device.
Figure 15:
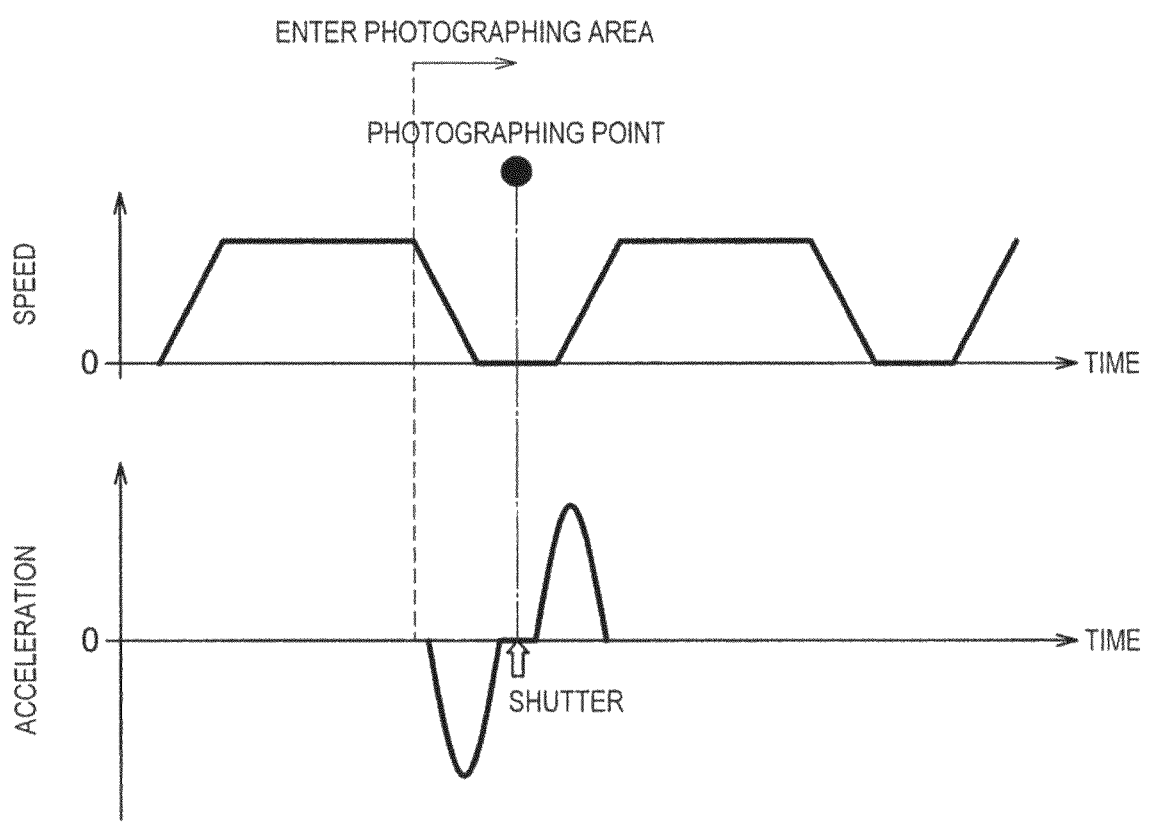
FIG. 15 is a conceptual diagram illustrating situations of change in speed and acceleration of the hovering camera at the time of photographing work based on flight information.

Exemplary control of the imaging device 101 and the illuminating device 105 at the time of photographing of the hovering camera 100 according to the present embodiment will be described below based on FIGS. 13 to 15. Note that FIG. 13 is a flowchart of the exemplary control of the imaging device 101 and the illuminating device 105 at the time of photographing of the hovering camera 100 according to the present embodiment. FIG. 14 is a flowchart for describing an example of shutter control of the imaging device 101. FIG. 15 is a conceptual diagram illustrating situations of change in speed and acceleration of the hovering camera 100 at the time of photographing work based on flight information.

When photographing work based on flight information is started, the hovering camera 100 first sets photographing parameters that are setting information of the imaging device 101 and the illuminating device 105 (step S200). The photographing parameters include, for example, a shutter speed and a photographing gain of the imaging device 101, set illuminance of the illuminating device 105, and the like. The photographing parameters are set in advance in, for example, the storage unit 140 of the hovering camera 100. The photographing parameter setting section 111 acquires photographing parameters necessary for gaining an image quality required for a captured image from the storage unit 140, and outputs them to the illuminating control section 115 and the shutter control section 117 to set them for the imaging device 101 and the illuminating device 105.

Next, the detection information acquisition section 113 acquires position information of the fuselage and fuselage information at the time of photographing acquired by the sensor unit 130 and the position information acquisition unit 132 (step S202). For example, the detection information acquisition section 113 outputs the acquired various kinds of information to the illuminating control section 115 and the shutter control section 117. Accordingly, the illuminating control section 115 and the shutter control section 117 can start control of the illuminating device 105 and the imaging device 101 so as to attain the photographing parameters set in step S200.

The hovering camera 100 continues movement to a photographing point until it reaches the photographing point. Here, when the hovering camera 100 enters a photographing area that is a predetermined range including the photographing point, the photographing point gets closer, and thus the control unit 110 starts preparation for photographing (step S204). First, the illuminating control section 115 turns on the illuminating device 105 (step S206). The illuminating device 105 may have been turned on during the movement to the photographing point, or may perform illuminating of the photographing range S at the time of photographing. If the illuminating device 105 is turned on when the hovering camera enters the photographing area and gets close to the photographing point, the time for which the illuminating device 105 is turned on can be shortened, and battery consumption can also be suppressed.

With regard to the entering into the photographing area, it may be determined that the hovering camera 100 has entered the photographing area at a time point at which, for example, the hovering camera has started reducing its speed to stand still at the photographing point. Alternatively, it may be determined that the hovering camera 100 has entered the photographing area when an area at a predetermined distance from the photographing point is defined as the photographing area and the presence of the hovering camera 100 within the photographing area is specified from position information of the fuselage.

When the illuminating device 105 is turned on, light of the respective light sources 106 of the illuminating device 105 is modulated according to the inclination of the fuselage obtained from the fuselage information as described above. This light modulation is performed at the photographing point such that the illuminance set based on set parameters is ensured and the illuminance distribution in the photographing range S on the photographing plane become substantially uniform.

Next, the shutter control section 117 starts shutter control of the imaging device 101 (step S208). The shutter control section 117 releases the shutter of the imaging device 101 when the hovering camera 100 reaches the photographing point to acquire an image at the photographing point. If the attitude of the hovering camera 100 of this time is in a stable state, blurring barely occurs in the photographed image, and thus a more highly precise image can be acquired. Thus, the shutter control section 117 determines whether the absolute value of the speed of the hovering camera 100 is smaller than a threshold speed $v_{th}$ and the absolute value of the acceleration is smaller than a threshold acceleration $a_{th}$ as illustrated in FIG. 14 to determine whether or not the attitude of the hovering camera 100 is stable (step S2081).

When the hovering camera 100 enters the photographing area and the speed linearly decreases as illustrated in FIG. 15, for example, the acceleration of the hovering camera 100 changes by describing a parabola of negative values. On the other hand, when photographing ends at the photographing point and the speed of the hovering camera 100 linearly increases to start moving to the next photographing point, the acceleration changes by describing a parabola of positive values. However, when the hovering camera 100 does not move, the speed and the acceleration are substantially zero, and the hovering camera 100 is in a stable state approximating to a standing still state. At this time, since vibration of the fuselage of the hovering camera 100 is weak, the imaging device 100 can perform photographing without being significantly influenced by the vibration of the fuselage. The threshold speed $v_{th}$ and the threshold acceleration $a_{th}$ are set to, for example, positive values substantially close to zero.

Then, when the absolute value of the speed of the hovering camera 100 is smaller than the threshold speed $v_{th}$, and the absolute value of the acceleration is smaller than the threshold acceleration $a_{th}$, the shutter control section 117 causes the shutter to be driven to perform photographing (step S2083). At this time, the shutter speed of the imaging device 101 is decided based on the exposure time set in step S200 of FIG. 13. Thus, since the photographing by the imaging device 101 is performed at the shutter speed at which the influence of the vibration of the fuselage can be eliminated, a highly precise image with no blurring can be acquired.

Note that the shutter control process illustrated in FIG. 14 is a process executed between steps S208 to S214 of FIG. 13.

Returning to the description of FIG. 13, during the period in which the shutter control section 117 starts shutter control in step S208 and ends the shutter control in step S214, the illuminating control section 115 continues the light modulation of the illuminating device 105 according to the inclination of the fuselage of the hovering camera 100. Note that the operation of light modulation may be stopped during the exposure time for photographing and the light source state may be fixed. Then, when the shutter works in step S2083 of FIG. 14 and photographing is completed (step S212), the shutter control section 117 ends the shutter control (step S214), and the illuminating control section 115 turns off the illuminating device 105 (step S216).

Thereafter, the control unit 110 determines whether or not photographing at all photographing points set in the flight information has been completed (step S218). When there is a remaining photographing point at which photographing has not been completed in step S218, the hovering camera 100 moves to the next photographing point (step S220), and repeats the processes from step S202. On the other hand, when photographing has been completed at all the photographing points in step S218, the hovering camera 100 returns to the base station 600, and ends work.

Exemplary control of the imaging device 101 and the illuminating device 105 at the time of photographing by the hovering camera 100 according to the present embodiment has been described above. Note that, although the case in which both the light modulation of the illuminating device 105 by the illuminating control section 115 and the shutter control by the shutter control section 117 are executed has been described above, the present disclosure is not limited to this example. Light modulation of the illuminating device 105 by the illuminating control section 115 and shutter control by the shutter control section 117 can be executed independently of each other.

[5.4. Lens Inclination Control of Imaging Device]

The control unit 110 of the hovering camera 100 according to the present embodiment has the attitude control section 119 which controls inclination of the lens of the imaging device 101 as illustrated in FIG. 6. The imaging device 101 has a first driving unit that causes the lens of the imaging device 101 to rotate in a tilt direction to change a photographing direction of the imaging device 101 in the tilt direction. Accordingly, photographing at the same position can be continued regardless of an inclination of the fuselage.

In addition, the hovering camera 100 according to the present embodiment may further have a second driving unit which adjusts an inclination of the lens in a roll direction to acquire more highly precise images. Accordingly, even when vibration of a low frequency equal to or lower than 100 Hz occurs to the fuselage due to a disturbance, for example, wind or the like, the influence of the vibration on photographing can be eliminated by the attitude control section 119 causing the second driving unit to be driven to adjust an inclination in the roll direction.

Figure 16:
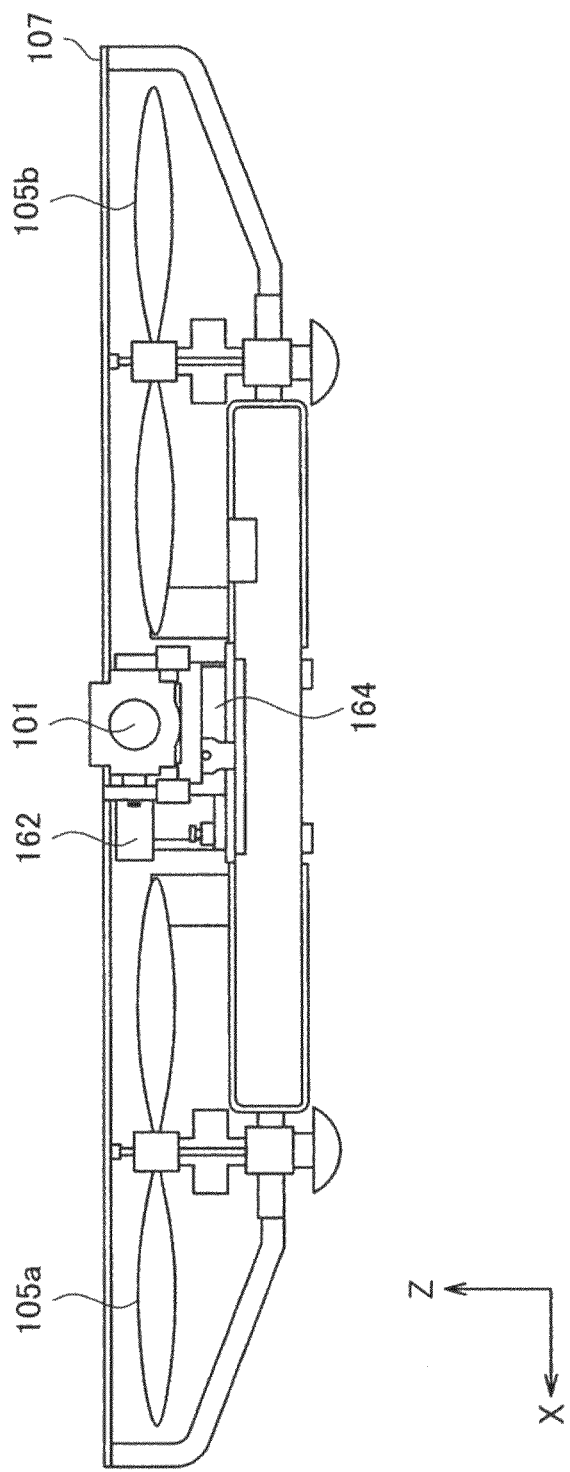
FIG. 16 is a schematic front diagram of a lower frame part of the hovering camera according to the embodiment of the present invention.
Figure 17:
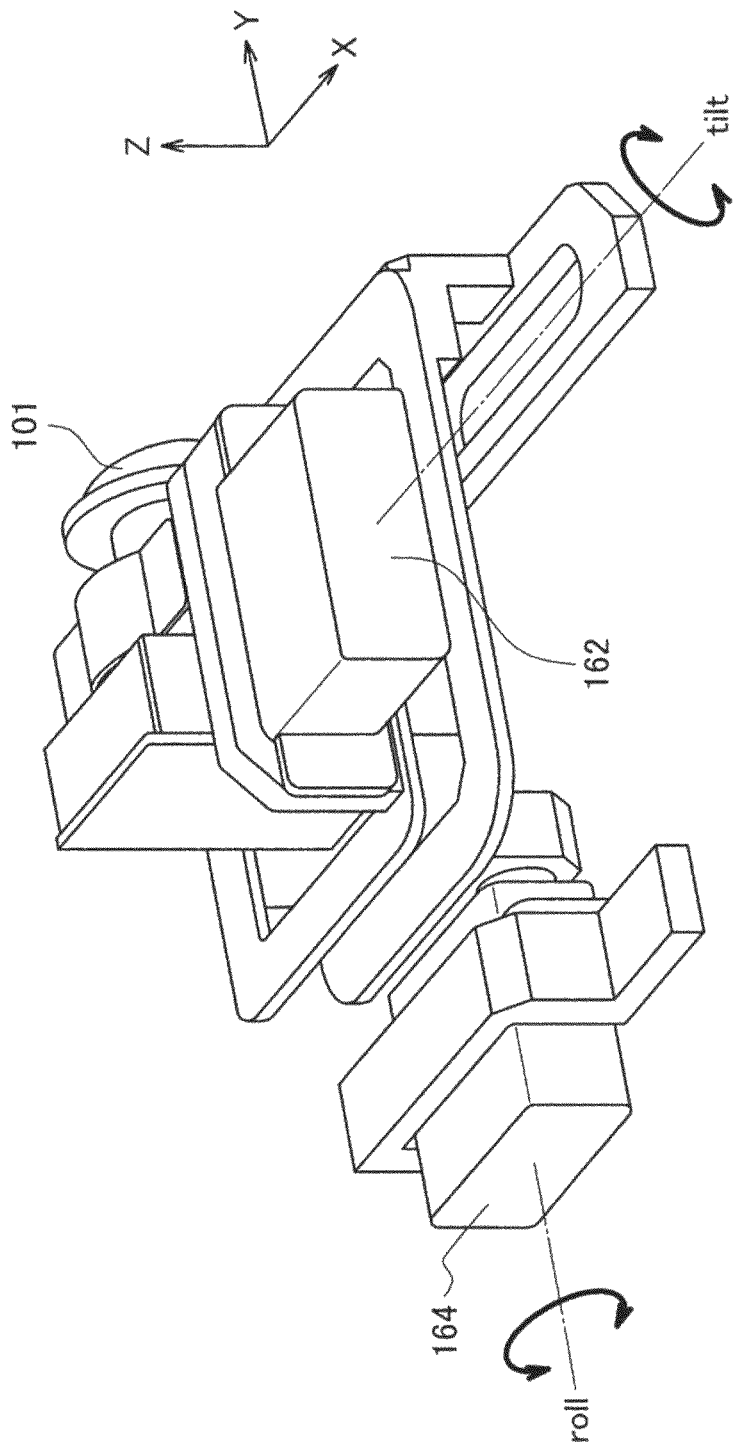
FIG. 17 is a schematic perspective diagram illustrating a first driving unit and a second driving unit that drive a lens of the imaging device from a plane side.

The first driving unit 162 and the second driving unit 164 for driving the lens of the imaging device 100 can be provided as illustrated in, for example, FIGS. 16 and 17. FIG. 16 is a schematic front diagram of a lower frame unit 107 of the hovering camera 100 according to the present embodiment. FIG. 17 is a schematic perspective diagram illustrating the first driving unit 162 and the second driving unit 164 for driving the lens of the imaging device 101 from a plane side.

As illustrated in FIG. 16, the imaging device 101 is provided facing, for example, the front side (the positive Y axis direction) of the lower frame unit 107 of the hovering camera 100. The lens of the imaging device 101 is provided to be rotatable in the tilt direction by the first driving unit 162 as illustrated in FIG. 17. Accordingly, a photographing direction of the imaging device 101 can be set to face from a downward side to a front side and further to an upward side. In addition, the lens of the imaging device 101 according to the present embodiment is provided to be rotatable in the roll direction by the second driving unit 164 that is provided, for example, on the back side (the negative Y axis direction, and the inner side of the hovering camera 100) of the imaging device 101 as illustrated in FIG. 17. The second driving unit 164 can cause the lens to rotate in the roll direction by, for example, about ±150 from the state in which the imaging device 101 is facing the front.

By providing a biaxial servo mechanism in the lens as described above, not only can photographing of the same position be performed regardless of an inclination of the fuselage, but also low-frequency vibration can be removed, and thus more highly precise image can be acquired.

6. Conclusion

So far, the configuration of the hovering camera 100 constituting the inspection system 10 according to an embodiment of the present disclosure, inspection work using the same, and control of the illuminating device 105 and the imaging device 101 at the time of acquiring an image have been described. The hovering camera 100 controls attitudes of the fuselage and photographing conditions of the imaging device 101 and the illuminating device 105 mounted in the flight vehicle, without using a large-sized gimbal, a single-lens reflex camera, or the like.

For example, the hovering camera 100 has the illuminating device 105, and the sensor unit 130 provided inside the hovering camera 100 senses an inclination of the fuselage by the illuminating control section 115, and a light amount of the illuminating device 105 is adjusted according to the inclination of the fuselage. Accordingly, illuminance of the photographing plane can be maintained substantially uniformly at a fixed value or higher, and images having a given level of quality can be obtained, without changing parameters of the imaging device 101.

In addition, by increasing a shutter speed that is a photographing parameter of the imaging device 101, the influence of high-frequency vibration that is not resolved with general hand-shake correction is eliminated. Accordingly, highly precise images with little blurring can be acquired. Furthermore, by providing the servo mechanism that can drive the lens of the imaging device 101 to rotate around two axes of the tilt direction and the roll direction, the influence of low-frequency vibration can be eliminated while maintaining a fixed photographing direction.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In order to make an illuminance distribution in the photographing range S on the photographing plane substantially uniform in the present embodiment, for example, only the inclination of the imaging device 101 is adjusted and the illuminating device 105 adjusts a light amount to make illuminance obtained when light is radiated onto the photographing plane substantially uniform. However, the present technology is not limited thereto. For example, by integrating the imaging device 101 and the illuminating device 105 and adjusting their inclination, the illuminance distribution in the photographing range S on the photographing plane can be made substantially uniform. In this case, since the imaging device 101 and the illuminating device 105 can be controlled as one unit, the illuminance distribution in the photographing range S necessary for photographing can be easily set. Note that, when the imaging device 101 and the illuminating device 105 are integrated, the sizes of operable portions of the hovering camera 100 increase, and thus an increasing overall weight should be taken into account.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
A control device including:
an illuminating control unit configured to adjust a light amount of an illuminating device according to an inclination of a fuselage of a flight vehicle device that has an imaging device configured to photograph a photographing target and the illuminating device configured to illuminate the photographing target.

(2)
The control device according to (1), wherein the inclination of the fuselage is an inclination with respect to a horizontal plane.

(3)
The control device according to (1), wherein the inclination of the fuselage is an inclination with respect to the photographing target.

(4)
The control device according to any one of (1) to (3), wherein the illuminating control unit adjusts a light amount of the illuminating device so that illuminance of a photographing plane of the photographing target becomes substantially uniform.

(5)
The control device according to any one of (1) to (4), wherein the illuminating control unit turns on the illuminating device when entering a photographing area in a vicinity of a photographing point at which the flight vehicle device photographs the photographing target.

(6)
The control device according to any one of (1) to (5), including:
a shutter control unit configured to control a shutter of the imaging device,
wherein the shutter control unit operates the shutter when a movement speed of the flight vehicle device is equal to or lower than a predetermined value and movement acceleration of the flight vehicle device is equal to or lower than a predetermined value.

(7)
A control method including:
acquiring an inclination of a fuselage of a flight vehicle device with respect to a photographing target, the flight vehicle device including an imaging device configured to photograph the photographing target, and an illuminating device configured to illuminate the photographing target; and
adjusting a light amount of the illuminating device according to the inclination of the fuselage.

(8)
A flight vehicle device including:
an imaging device configured to photograph a photographing target;
an illuminating device configured to illuminate the photographing target; and
a control unit configured to adjust a light amount of the illuminating device according to an inclination of a fuselage with respect to the photographing target.

(9)
The flight vehicle device according to (8), wherein the control unit adjusts a light amount of the illuminating device so that illuminance of a photographing plane of the photographing target becomes substantially uniform.

(10)
The flight vehicle device according to (8) or (9), wherein the illuminating device includes a plurality of LED light sources.

(11)
The flight vehicle device according to (10), wherein a plurality of light sources are installed in a two-dimensional array shape on one or a plurality of surfaces constituting the flight vehicle device, the one or plurality of surfaces facing the photographing target.

(12)
The flight vehicle device according to (11),
wherein the plurality of light sources are installed in a plurality of regions, and
the control unit controls light amounts of the plurality of light sources for each of the plurality of regions according to the inclination of the fuselage.

(13)
The flight vehicle device according to (11) or (12), wherein the plurality of light sources include an LED light source.

(14)
The flight vehicle device according to any one of (10) to (13), wherein at least some LED light sources among the LED light sources have an optical member that changes directionality.

(15) The flight vehicle device according to any one of (8) to (14), including:
a first driving unit configured to drive the imaging device to rotate the imaging device in a tilt direction; and
a second driving unit configured to drive the imaging device to rotate the imaging device in a roll direction.

REFERENCE SIGNS LIST 10 inspection system
100 hovering camera
101 imaging device
104a to 104d rotor
105 illuminating device
108a to 108d motor
110 control unit
111 photographing parameter setting section
113 detection information acquisition section
115 illuminating control section
117 shutter control section
119 attitude control section
120 communication unit
130 sensor unit
132 position information acquisition unit
140 storage unit
150 battery
200 control terminal
300 information processing device
400 wireless relay node
500 position estimation node
600 base station
700 charging station

The invention claimed is:

1. A control device, comprising:
circuitry configured to:
control a flight of a flight vehicle device in accordance with flight information including at least flight path information of the flight vehicle device, the flight vehicle device including an imaging device to acquire an image of a target, wherein the flight information is generated based on a flight time of the flight vehicle device;
control the flight vehicle device to maintain the imaging device at a predetermined distance from the target at a plurality of imaging points;
determine whether an attitude of the flight vehicle device is stable based on a movement speed of the flight vehicle device and a movement acceleration of the flight vehicle device;
determine that the attitude of the flight vehicle device is stable when the movement speed of the flight vehicle device is zero and the acceleration of the flight vehicle device is zero;
control the imaging device to acquire the image of the target at the plurality of imaging points while at the predetermined distance from the target and stable;
control the flight vehicle to output the image of the target and the position of the flight vehicle for a remote control device in real-time during flight; and
control the remote control device to display the position of the flight vehicle and the image of the target in real-time during flight.

2. The control device according to claim 1, wherein the flight vehicle device includes an illumination device, and the circuitry is further configured to cause the illumination device to emit light when the flight vehicle device is within a predetermined distance of the target.

3. The control device according to claim 2, wherein the light emitted by the illumination device is modulated based on a body position of the flight vehicle device.

4. The control device according to claim 3, wherein the light emitted by the illumination device is modulated so that the target is uniformly illuminated.

5. The control device according to claim 1, wherein the circuitry is further configured to activate a shutter of the imaging device when the attitude of the flight vehicle device is determined to be stable.

6. The control device according to claim 1, wherein control of the flight vehicle device includes linearly decreasing a movement speed of the flight vehicle device when the flight vehicle device enters a predetermined range with respect to the target.

7. The control device according to claim 1, wherein an acceleration of the flight vehicle device according to a parabola of negative values.

8. The control device according to claim 1, wherein a shutter speed and photographing gain of the imaging device are set and stored in the imaging device in advance.

9. The control device according to claim 8, wherein the circuitry is further configured to activate a shutter of the imaging device based on the shutter speed and photographing gain stored in the imaging device.

10. The control device according to claim 3, wherein the circuitry is configured to stop modulation of the light emitted by the illumination device when a shutter of the imaging device is activated.

11. The control device according to claim 10, wherein the circuitry is configured to turn off the illumination device when activation of the shutter is complete and image capture has ended.

12. The control device according to claim 1, wherein images of the target acquired at the plurality of imaging points are captured at approximately the same scale.

13. The control device according to claim 1, wherein
the control device further records the position of the flight vehicle as metadata in a same file as the acquired image.

14. The control device according to claim 1, wherein
the control device further records the position of the flight vehicle as metadata in a file separate from the acquired image.

15. The control device according to claim 1, wherein
the flight time of the flight vehicle is at least one of a traveling time of the flight vehicle to a certain position or an available flight period of time of the flight vehicle.

16. A control method, comprising:
controlling, using circuitry, a flight of a flight vehicle device in accordance with flight information including at least flight path information of the flight vehicle device, the flight vehicle device including an imaging device to acquire an image of a target;
controlling, using the circuitry, the flight vehicle device to maintain the imaging device at a predetermined distance from the target at a plurality of imaging points;
determining whether an attitude of the flight vehicle device is stable based on a movement speed of the flight vehicle device and a movement acceleration of the flight vehicle device;

determining that the attitude of the flight vehicle device is stable when the movement speed of the flight vehicle device is zero and the acceleration of the flight vehicle device is zero;

controlling, using the circuitry, the imaging device to acquire the image of the target at the plurality of imaging points while at the predetermined distance from the target and stable;

controlling, using the circuitry, the flight vehicle to output the image of the target and the position of the flight vehicle for a remote control device in real-time during flight; and controlling the remote control device to display the position of the flight vehicle and the image of the target in real-time during flight.

17. A non-transitory computer readable storage device having computer readable instructions that when executed by circuitry cause the circuitry to:

control a flight of a flight vehicle device in accordance with flight information including at least flight path information of the flight vehicle device, the flight vehicle device including an imaging device to acquire an image of a target, wherein the flight information is generated based on a flight time of the flight vehicle device;

control the flight vehicle device to maintain the imaging device at a predetermined distance from the target at a plurality of imaging points;

determine whether an attitude of the flight vehicle device is stable based on a movement speed of the flight vehicle device and a movement acceleration of the flight vehicle device;

determine that the attitude of the flight vehicle device is stable when the movement speed of the flight vehicle device is zero and the acceleration of the flight vehicle device is zero;

control the imaging device to acquire the image of the target at the plurality of imaging points while at the predetermined distance from the target and stable;

control the flight vehicle device to output the image of the target and a position of the flight vehicle device for a remote control device in real-time during flight; and control the remote control device to display the position of the flight vehicle and the image of the target in real-time during flight.

\* \* \* \* \*